US011510150B2

(12) United States Patent
Rahman et al.

(10) Patent No.: US 11,510,150 B2
(45) Date of Patent: Nov. 22, 2022

(54) DERIVING CONFIGURED OUTPUT POWER FOR CONSECUTIVE TRANSMISSION TIME INTERVALS (TTIS) IN SHORTENED TTI PATTERNS

(71) Applicant: Telefonaktiebolaget LM Ericsson (publ), Stockholm (SE)

(72) Inventors: Imadur Rahman, Sollentuna (SE);
Christian Bergljung, Lund (SE);
Christopher Callender, Kinross (GB);
Dominique Everaere, Åkersberga (SE);
Muhammad Kazmi, Sundbyberg (SE);
Mårten Sundberg, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/349,519

(22) PCT Filed: Nov. 14, 2017

(86) PCT No.: PCT/IB2017/057116
§ 371 (c)(1),
(2) Date: May 13, 2019

(87) PCT Pub. No.: WO2018/087742
PCT Pub. Date: May 17, 2018

(65) Prior Publication Data
US 2019/0342840 A1 Nov. 7, 2019

Related U.S. Application Data

(60) Provisional application No. 62/421,582, filed on Nov. 14, 2016.

(51) Int. Cl.
*H04W 52/18* (2009.01)
*H04W 72/04* (2009.01)
(Continued)

(52) U.S. Cl.
CPC ....... *H04W 52/18* (2013.01); *H04W 72/0446* (2013.01); *H04L 5/0007* (2013.01); *H04W 52/367* (2013.01)

(58) Field of Classification Search
None
See application file for complete search history.

(56) References Cited

U.S. PATENT DOCUMENTS

2013/0242889 A1* 9/2013 Khoryaev ............. H04L 1/1607
370/329
2017/0290008 A1* 10/2017 Tooher .............. H04W 72/0446
(Continued)

FOREIGN PATENT DOCUMENTS

CN    101663852 A    3/2010
CN    105933100 A    9/2016
(Continued)

OTHER PUBLICATIONS

Russian Decision on Grant and Search Report issued in Russian Application No. 2019118307 dated Oct. 24, 2019 consisting of 25 pages.
(Continued)

*Primary Examiner* — Adnan Baig
(74) *Attorney, Agent, or Firm* — Christopher & Weisberg, P.A.

(57) ABSTRACT

A network node is provided. The network node includes circuitry configured to determine a Transmission Time Interval, TTI, configuration, the TTI configuration including a first TTI for operating a first signal between a first cell on a first carrier and a wireless device, and a second TTI for operating a second signal between the first cell on the first carrier and the wireless device, the TTI configuration including one of: the first TTI adjacent to the second TTI which do not overlap with each other in time; and the first TTI adjacent to the second TTI which at least partly overlap with
(Continued)

each other in time, and configured to receive the first signal in the first TTI and the second signal in the second TTI, the first TTI and second TTI having been transmitted based on a maximum output power parameter that is based on the TTI configuration.

28 Claims, 14 Drawing Sheets

(51) Int. Cl.
    *H04L 5/00*           (2006.01)
    *H04W 52/36*        (2009.01)

(56) References Cited

U.S. PATENT DOCUMENTS

2018/0098337 A1*   4/2018   Lee .................. H04W 72/1273
2018/0213489 A1*   7/2018   Andou ................. H04W 72/04

FOREIGN PATENT DOCUMENTS

| | | |
|---|---|---|
| RU | 2 385 534 C2 | 3/2010 |
| WO | 2015/116866 A1 | 8/2015 |
| WO | WO-2018027540 A1 * | 2/2018 ............. H04L 29/06 |

OTHER PUBLICATIONS

Huawei, HiSilicon; 3GPP TSG RAN WG1 Meeting #87; R1-1611161; Agenda Item: 6.2.10.2.7; Title: "UL Power Control for Short TTI"; Document for: Discussion and Decision; Reno, USA, Nov. 14-18, 2016, consisting of 5 pages.
International Search Report and Written Opinion of the International Searching Authority dated Feb. 14, 2018 Bsued in PCT Application No. PCT/IB2017/057116, consisting of 14 pages.
Written Opinion of the International Preliminary Examining Authority dated Nov. 12, 2018 issued in PCT Application No. PCT/IB2017/057116, consisting of 7 pages.
Notification of the Transmittal of the International Preliminary Report on Patentability dated May 2, 2019 issued in PCT Application No. PCT/IB2017/057116, consisting of 31 pages.
3GPP TS 36.101 V14.1.0 (Sep. 2016); 3rd Generation Partnership Project; Technical Specification Group Radio Access Network; Evolved Univeral Terrestrial Radio Access (E-UTRA); User Equipment UE Radio Transmission and Reception (Release 14), consisting of 1187 pages.
3GPP TSG-RAN WG1 #86 bis, Lisbon, Portugal Oct. 10-14, 2016; R1-1611055; Source: RAN1; Title: LS on Shortened TTI and Processing Time for LTE; Release 15; Work Item: LTE_sTTIandPT, consisting of 4 pages.
3GPP TSG-RAN WG1 #87, Reno, US Nov. 14-18, 2016; R1-1611530; Agenda Item: 6.2.10.2.5; Source Ericsson; Title: Possible RF Impacts Related to sPUSCH Design; Document for Discussion, Decision, consisting of 2 pages.
3GPP TSG-RAN WG4 #81, Reno, Nevada, USA, Nov. 14-18, 2016; R4-1610470; Agenda Item: 10.1.2; Source Ericsson; Title: UL Power Control Issues Related to Shortened TTI Patterns; Document for Discussion, consisting of 4 pages.
3GPP TS 36.331 V14.0.0 (Sep. 2016); 3rd Generation Partnership Project; Technical Specification Group Radio Access Network; Evolved Universal Terrestrial Radio Access (E-UTRA); Radio Resource Control (RRC); Protocol Specification (Release 14), consisting of 644 pages.
Indian First Examination Report dated Jan. 19, 2021 issued in corresponding Indian Patent Application No. 201947022646, consisting of 5 pages.
Chinese Office Action and English translation dated May 21, 2021 issued in corresponding Chinese Patent Application No. 201780082912. X, consisting of 14 pages.
3GPP TSG RAN WG1 Meeting #86; R1-166153; Agenda Item: 7.2.12.2.1; Source: Huawei, HiSilicon; Title: PUSCH Design for Short TTI; Document for: Discussion and Decision, consisting of 3 pages.
European Communication Pursuant to Article 94(3) EPC dated Mar. 15, 2021 issued in corresponding European Patent Application No. 17 811 382.5, consisting of 5 pages.

* cited by examiner

DERIVING CONFIGURED OUTPUT POWER FOR CONSECUTIVE TRANSMISSION TIME INTERVALS (TTIS) IN SHORTENED TTI PATTERNS

CROSS-REFERENCE TO RELATED APPLICATIONS

This application is a Submission Under 35 U.S.C. § 371 for U.S. National Stage Patent Application of International Application No.: PCT/IB2017/057116, filed Nov. 14, 2017 entitled "DERIVING CONFIGURED OUTPUT POWER FOR CONSECUTIVE TRANSMISSION TIME INTERVALS (TTIS) IN SHORTENED TTI PATTERNS," which claims priority to U.S. Provisional Application No. 62/421,582, filed Nov. 14, 2016, entitled "DERIVING CONFIGURED OUTPUT POWER FOR CONSECUTIVE TTIS IN SHORTENED TTI PATTERNS," the entireties of both of which are incorporated herein by reference.

TECHNICAL FIELD

The present disclosure relates, in general, to wireless communications and, more particularly, to deriving configured output power for consecutive Transmission Time Intervals (TTIs) in shortened TTI patterns.

BACKGROUND

LTE uses OFDM in the downlink and DFT-spread OFDM in the uplink. In the time domain, LTE downlink transmissions are organized into radio frames of 10 ms, each radio frame consisting of ten equally-sized subframes of length $T_{subframe}=1$ ms. An example LTE time-domain structure is illustrated in FIG. 1.

The resource allocation in LTE is typically described in terms of resource blocks (RB). A resource block corresponds to one slot (0.5 ms) in the time domain and 12 contiguous subcarriers in the frequency domain. A pair of two adjacent resource blocks in time direction (1.0 ms) may be known as a resource block pair. This is also denoted as TTI (Transmission Time Interval).

Downlink transmissions are dynamically scheduled. For example, in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical HARQ indication channels (PHICH) carrying ACK/NACK for the uplink transmission.

The downlink subframe also contains common reference symbols (CRS), which are known to the receiver and used for coherent demodulation of e.g. the control information. A downlink system with CFI=3 OFDM symbols as control is illustrated in FIG. 2. In a Rel-8 TTI, one such portion of the DL transmission is termed as one TTI.

Uplink power control plays an important role in radio resource management which has been adopted in most modern communication systems. It balances the needs to maintain the link quality against the needs to minimize interference to other users of the system and to maximize the battery life of the terminal.

In LTE, the objective of power control is to determine the average power over a SC-FDMA symbol and it is applied for both common channel and dedicated channel (PUCCH/PUSCH/SRS). A combined open-loop and closed-loop power control was adopted as formulated in Equation 1 disclosed below:

Open loop power control: The wireless device (UE) calculates basic open-loop set-point based on the pathloss estimate and eNodeB controlled semi-static base level ($P_0$) comprising a nominal power level common for all UEs in the cell and a UE-specific offset;

Closed-loop power control: eNodeB updates the dynamic adjustment relative to set-point; the wireless device (UE) adjusts the transmit power upon the TPC commands. It is also possible to connect the power control to modulation and coding scheme used for the uplink transmission.

$$P_{UE} = \min\left\{P_{CMAX}, \underbrace{P_0 + \alpha \cdot PL}_{\text{open-loop set-point}} + \underbrace{f(i)}_{\substack{\text{closed-loop} \\ \text{adjustment}}} + \underbrace{\Delta_{TF}(i)}_{\text{MCS offset}} + \underbrace{10\log_{10}M}_{\substack{\text{bandwidth} \\ \text{factor}}}\right\} \quad \text{(Equation 1)}$$

Uplink power control is used both on the PUSCH and on PUCCH. The purpose is to ensure that the mobile terminal transmits with sufficiently high but not too high power since the latter would increase the interference to other users in the network. In both cases, a parameterized open loop combined with a closed loop mechanism is used. Roughly, the open loop part is used to set a point of operation, around which the closed loop component operates. Different parameters (targets and 'partial compensation factors') for user and control plane are used.

In more detail, for PUSCH the mobile terminal sets the output power according to the following equation:

$$P_{PUSCH_c}(i) = \min\{P_{MAX,c}, 10\log_{10}(M_{PUSCH_c}(i)) + P_{O\_PUSCH}(j) + \alpha_c \cdot PL_c + \Delta_{TF_c}(i) + f_c(i)\} \text{ [dBm]},$$

where $P_{MAX'}$ is the maximum transmit power for the mobile terminal, $M_{PUSCH_c}(i)$ is the number resource blocks assigned, $P_{O\_PUSCH_c}(j)$ and $\alpha_c$ control the target received power, $PL_c$ is the estimated pathloss, $\Delta_{TF_c}(i)$ is transport format compensator and $f_c(i)$ is the a UE specific offset or 'closed loop correction' (the function $f_c$ may represent either absolute or accumulative offsets). The index c numbers the component carrier and is only of relevance for Carrier Aggregation.

The closed loop power control can be operated in two different modes either accumulated or absolute. Both modes are based on TPC a command which is part of the downlink control signaling. When absolute power control is used, the closed loop correction function is reset every time a new power control command is received. When accumulated power control is used, the power control command is a delta correction with regard to the previously accumulated closed loop correction. The accumulated power control command is defined as $f_c(i)=f_c(i-1)+\delta_{PUSCHc}(i-K_{PUSCH})$, where $\delta_{PUSCH}$ is the TPC command received in $K_{PUSCH}$ subframe before the current subframe i and $f_c(i-1)$ is the accumulated power control value. The absolute power control has no memory, i.e. $f_c(i)=\delta_{PUSCHc}(i-K_{PUSCH})$.

The PUCCH power control has in principle the same configurable parameters with the exception that PUCCH only has full pathloss compensation, i.e. does only cover the case of $\alpha=1$.

Typically, configured transmitted power PCMAX is defined in Section 6.2.5 of 3GPP TS 36.101 publicly available at www.3GPP.org as written next:

6.2.5 Configured Transmitted Power

The UE is allowed to set its configured maximum output power $P_{CMAX,c}$ for serving cell c. The configured maximum output power $P_{CMAX,c}$ is set within the following bounds:

$$P_{CMAX\_L,c} \le P_{CMAX,c} \le P_{CMAX\_H,c} \text{ with}$$

$$P_{CMAX\_L,c}=\text{MIN}\{P_{EMAX,c}-\Delta T_{C,c}, P_{PowerClass}-\text{MAX}(MPR_c+A-MPR_c+\Delta T_{IB,c}+\Delta T_{C,c}, P-MPR_c)\}$$

$$P_{CMAX\_H,c}=\text{MIN}\{P_{EMAX,c}, P_{PowerClass}\}$$

where $P_{EMAX,c}$ is the value given by IE P-Max for serving cell c, defined in 3GPP TS 36.331 publicly available at www.3GPP.org;

$P_{PowerClass}$ is the maximum UE power specified in Table 6.2.2-1 without taking into account the tolerance specified in the Table 6.2.2-1;

$MPR_c$ and $A-MPR_c$ for serving cell c are specified in subclause 6.2.3 and subclause 6.2.4, respectively;

$\Delta T_{IB,c}$ is the additional tolerance for serving cell c as specified in Table 6.2.5-2; $\Delta T_{IB,c}=0$ dB otherwise;

$\Delta T_{C,c}=1.5$ dB when Note 2 in Table 6.2.2-1 applies;

$\Delta T_{C,c}=0$ dB when Note 2 in Table 6.2.2-1 does not apply.

$P-MPR_c$ is the allowed maximum output power reduction for a) ensuring compliance with applicable electromagnetic energy absorption requirements and addressing unwanted emissions/self-defense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The UE shall apply $P-MPR_c$ for serving cell c only for the above cases. For UE conducted conformance testing P-MPR shall be 0 dB NOTE 1: $P-MPR_c$ was introduced in the $P_{CMAX,c}$ equation such that the UE can report to the eNB the available maximum output transmit power. This information can be used by the eNB for scheduling decisions.

NOTE 2: $P-MPR_c$ may impact the maximum uplink performance for the selected UL transmission path.

For each subframe, the $P_{CMAX\_L,c}$ for serving cell c is evaluated per slot and given by the minimum value taken over the transmission(s) within the slot; the minimum $P_{CMAX\_L,c}$ over the two slots is then applied for the entire subframe. $P_{PowerClass}$ shall not be exceeded by the UE during any period of time.

The measured configured maximum output power $P_{UMAX,c}$ shall be within the following bounds:

$$P_{CMAX\_L,c}-\text{MAX}\{T_L, T(P_{CMAX\_L,c})\} \le P_{UMAX,c} \le P_{CMAX\_H,c}+T(P_{CMAX\_H,c})$$

where $T(P_{CMAX,c})$ is defined by the tolerance table below and applies to $P_{CMAX\_L,c}$ and $P_{CMAX\_H,c}$ separately, while $T_L$ is the absolute value of the lower tolerance in Table 6.2.2-1 for the applicable operating band.

| $P_{CMAX,c}$ (dBm) | Tolerance $T(P_{CMAX,c})$ (dB) |
|---|---|
| $23 < P_{CMAX,c} \le 33$ | 2.0 |
| $21 \le P_{CMAX,c} \le 23$ | 2.0 |
| $20 \le P_{CMAX,c} < 21$ | 2.5 |
| $19 \le P_{CMAX,c} < 20$ | 3.5 |
| $18 \le P_{CMAX,c} < 19$ | 4.0 |
| $13 \le P_{CMAX,c} < 18$ | 5.0 |
| $8 \le P_{CMAX,c} < 13$ | 6.0 |
| $-40 \le P_{CMAX,c} < 8$ | 7.0 |

For the UE that supports inter-band carrier aggregation configurations with uplink assigned to one E-UTRA band the $\Delta T_{IB,c}$ is defined for applicable bands in Table 6.2.5-2.

Latency Reduction with Short Subframes

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 13, a study item is starting during 2015, with the goal of specifying transmissions with shorter TTIs that are much shorter than the LTE release 8 TTI. The shorter TTIs can be decided to have any duration in time and comprise resources on a number of OFDM or SC-FDMA symbols within a 1 ms SF, but the slot size remains unchanged, i.e., slot size is equal to 0.5 ms. As one example, the duration of the short TTI may be 0.5 ms, i.e. seven OFDM or SC-FDMA symbols for the case with normal cyclic prefix.

As another example, the duration of the short TTI may be 2 symbols.

As shown in FIG. 2, the TTI length consists of 14 OFDM symbols. In case of shortened TTI, the TTI length can be reduced to 2-OFDM symbols, 4-OFDM symbols or 7-OFDM symbols. These are denoted as: 2-OS sTTI, 4-OS sTTI, 7-OS sTTI, respectively.

The shortened TTI can be used in different values in different direction, such as DL and UL. For example: a DL can use 2-OS sTTI, while UL can use 4-OS sTTI in the same cell.

For different frame structures, such as FS1, FS2 and FS3, the sTTI that is used could be different too. The time domain structure in FIG. 1 relates to FS1. 2-OS, 4OS and 7 OS TTI are usable for FS1. For FS2 which is used for TDD, 7-OS sTTI is one of the shortened TTI mode. Some examples of TTI durations are illustrated in FIGS. 3 and 4. FIG. 3 illustrates an example 7-symbol sTTI structure supported for UL according to agreements in R1-1611055 publicly available at www.3GPP.org. If a 4-symbol UL sTTI is supported, the sTTI structure illustrated in FIG. 4 has been adopted according to agreements in R1-1611055 publicly available at www.3GPP.org.

FIG. 5 illustrates an example of UL TTI options.

The above example shows a proposal for different TTI length. The 2-OS sTTI can have one of the two options. From UL sTTI point of view, following is observed:

- There are three different TTI lengths that are possible for UL. Out of these, different patterns possible for 2OS TTI
- Dynamic indication of TTI length in fast UL grant can be done (however, this is still under discussion in 3GPP RAN WG1)
- Dynamic indication of DMRS position in fast UL grant can also be done.
- For some of the TTI patterns, shared DMRS is possible between UEs. For some UEs, this also means that, they will need to send DMRS for two TTIs when the UE is scheduled across neighboring TTIs.

SUMMARY

At least the following problems can be envisioned:

In the current specifications, the minimum UE transmit max power $P_{CMAX\_L,c}$ shall be evaluated per slot by the UE every subframe. This makes sense as the minimum resource unit is 1 RB, which corresponds to a 1 ms TTI value. Configured output power estimations across two slots are combined to determine the final configured output power for any subframe (or TTI). In case of shortened TTI (sTTI) patterns, the TTI durations may be very small (e.g. 2-OS TTI compared to 14-=S TTI). Thus, configured output power estimation timing window that is evaluated/calculated based on slots can be larger than TTI duration since the slot size of 0.5 ms remains unchanged for TTI and sTTI, i.e., shortening the TTI does not shorten the slot size of 0.5 ms. An example of 2-OS TTI durations are shown in FIG. 6.

In addition to this, there are cases when two consecutive TTIs can be overlapping to each other. One such example is shown in FIG. 7 and FIG. 8. There are other cases when overlapping DMRS may also occur between different TTI combinations. FIG. 7 illustrates overlapping TTIs for 2-OS TTI length when the overlapping symbol is common DMRS symbol. FIG. 8 illustrates overlapping TTIs for 4-OS TTI length when the overlapping symbol is common DMRS symbol.

With the introduction of the shorten TTI feature, a UE may be scheduled across two consecutive TTIs when one of the symbols of these two consecutive TTIs could be common to both TTIs. There is no rule for estimating Pcmax for such TTI arrangements.

Disclosed are aspects to derive configured output power for consecutive TTIs in shortened TTI patterns. For example, in one or more embodiments, the configured output power is derived for one or more TTIs based on the time window corresponding to the one or more TTIs, instead of deriving the configured output power on a slot basis.

According to a first aspect, a method for a wireless device for deriving configured output power for consecutive TTIs in shortened TTI patterns is provided, the method comprising:

determining a TTI configuration (TTI-CONF) comprising of a first TTI (TTI1) used for operating a first signal (S1) between a first cell (cell1) on a first carrier (F1) and the UE and a second TTI (TTI2) used for operating a second signal (S2) between the first cell (cell1) on the first carrier (F1), wherein TTI-CONF is one of: a first TTI configuration (CONF1) comprising adjacent TTI1 and TTI2 which do not overlap with each other in time, and a second TTI configuration (CONF2) comprising adjacent TTI1 and TTI2 which at least partly overlap with each other in time.

determining a single maximum output power parameter (P1) to be used by the UE for transmitting signals in two or more consecutive TTIs based on the determined TTI-CONF, transmitting signals S1 and S2 (or more signals) to cell1 in two (or more) consecutive TTIs according to TTI-CONF based on the determined maximum output power parameter (P1).

optionally, the method further includes using the determined P1 for one or more radio operational tasks (e.g. for measurements etc.).

The determining of the TTI configuration may include obtaining the TTI configuration, such as based on predefined rule and/or receiving it from a network node or another wireless device.

According to a second aspect, a wireless device for deriving configured output power for consecutive TTIs in shortened TTI patterns is provided. The wireless is operable to:

determine a TTI configuration (TTI-CONF) comprising of a first TTI (TTI1) used for operating a first signal (S1) between a first cell (cell1) on a first carrier (F1) and the UE and a second TTI (TTI2) used for operating a second signal (S2) between the first cell (cell1) on the first carrier (F1), wherein TTI-CONF is one of a first TTI configuration (CONF1) comprising adjacent TTI1 and TTI2 which do not overlap with each other in time, and a second TTI configuration (CONF2) comprising of adjacent TTI1 and TTI2 which at least partly overlap with each other in time.

determine a single maximum output power parameter (P1) to be used by the UE for transmitting signals in two or more consecutive TTIs based on the determined TTI-CONF, transmit signals S1 and S2 (or more signals) to cell1 in two (or more) consecutive TTIs according to TTI-CONF based on the determined maximum output power parameter (P1).

optionally, the instructions further cause the processor to use the determined P1 for one or more radio operational tasks (e.g. for measurements etc.).

The wireless device may be further operable to obtain the TTI configuration, such as based on pre-defined rule and/or receiving it from a network node or another wireless device.

According to a third aspect, a method for a network node for deriving configured output power for consecutive TTIs in shortened TTI patterns is provided, the method comprising:

configuring a wireless device with a TTI configuration (TTI-CONF) comprising of a first TTI (TTI1) used for operating a first signal (S1) between a first cell (cell1) on a first carrier (F1) and the wireless device and a second TTI (TTI2) used for operating a second signal (S2) between the first cell (cell1) on the first carrier (F1), wherein TTI-CONF is one of: a first TTI configuration (CONF1) comprising of adjacent TTI1 and TTI2 which do not overlap with each other in time, and a second TTI configuration (CONF2) comprising of adjacent TTI1 and TTI2 which at least partly overlap with each other in time.

determining a single maximum output power parameter (P1) to be used by the wireless device for transmitting signals in two or more consecutive TTIs based on the configured TTI-CONF.

receiving signals S1 and S2 (or more signals) in cell1 in two (or more) consecutive TTIs according to TTI-CONF from the wireless device based on the determined maximum output power parameter (P1).

optionally, the method further includes using the received signal and/or the determined value of P1 for one or more operational tasks.

According to a fourth aspect, a network node for deriving configured output power for consecutive TTIs in shortened TTI patterns is provided, wherein the network node is operable to:

configure a wireless device with a TTI configuration (TTI-CONF) comprising of a first TTI (TTI1) used for operating a first signal (S1) between a first cell (cell1) on a first carrier (F1) and the wireless device and a second TTI (TTI2) used for operating a second signal (S2) between the first cell (cell1) on a first carrier (F1), wherein TTI-CONF is any of: a first TTI configuration (CONF1) comprising of adjacent TTI1 and TTI2 which do not overlap with each other in time, and a second TTI configuration (CONF2) comprising of adjacent TTI1 and TTI2 which at least partly overlap with each other in time.

determine a single maximum output power parameter (P1) to be used by the wireless device for transmitting signals in two or more consecutive TTIs based on the configured TTI-CONF.

receive signals S1 and S2 (or more signals) in cell1 in two (or more) consecutive TTIs according to TTI-CONF from the wireless device based on the determined maximum output power parameter (P1).

Optionally, the network node is further operable to use the received signal and/or the determined value of P1 for one or more operational tasks.

Certain embodiments of certain aspects the present disclosure may provide one or more technical advantages, such as, one or more of the following:

The behavior of the wireless device with respect to configured transmitted power is well defined for two or more consecutive TTIs in shorter TTI patterns The method enables the network node to receive and process signals when UE transmit signals using same maximum power as function of TTI for different TTI durations.

Other advantages may be readily apparent to one having skill in the art. Certain embodiments may have none, some, or all of the recited advantages.

According to one aspect of the disclosure, a network node is provided. The network node includes circuitry. The circuitry is configured to determine a Transmission Time Interval, TTI, configuration, the TTI configuration including a first TTI for operating a first signal between a first cell on a first carrier and a wireless device, and a second TTI for operating a second signal between the first cell on the first carrier and the wireless device, the TTI configuration including one of: the first TTI adjacent to the second TTI which do not overlap with each other in time; and the first TTI adjacent to the second TTI which at least partly overlap with each other in time. The circuitry is further configured to receive the first signal in the first TTI and the second signal in the second TTI, the first TTI and second TTI having been transmitted based on a maximum output power parameter, the single maximum output power parameter being based on the TTI configuration.

According to one embodiment of this aspect, the first TTI and the second TTI have different time lengths. According to one embodiment of this aspect, the single maximum output power parameter is based on the time lengths of the first TTI and the second TTI. According to one embodiment of this aspect, the first TTI and the second TTI are each a shortened TTI of less than 1 ms that are included in a subframe, the subframe having two slots where each slot is 0.5 ms.

According to one embodiment of this aspect, the first TTI is subsequent in time to the second TTI. According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a method for a network node is provided. A Transmission Time Interval, TTI, configuration is determined. The TTI configuration includes a first TTI for operating a first signal between a first cell on a first carrier and a wireless device, and a second TTI for operating a second signal between the first cell on the first carrier and the wireless device, the TTI configuration including any of: the first TTI adjacent to the second TTI which do not overlap with each other in time; and the first TTI adjacent to the second TTI which at least partly overlap with each other in time. The first signal in the first TTI and the second signal in the second TTI are received, the first TTI and second TTI having been transmitted using a maximum output power, the maxim output power being based on the TTI configuration.

According to one embodiment of this aspect, the first TTI and the second TTI have different time lengths. According to one embodiment of this aspect, the maximum output power is based on the time lengths of the first TTI and the second TTI. According to one embodiment of this aspect, the first TTI and the second TTI are each a shortened TTI of less than 1 ms that are included in a subframe, the subframe having two slots where each slot is 0.5 ms.

According to one embodiment of this aspect, the first TTI is subsequent in time to the second TTI. According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a wireless device comprising circuitry is provided. The circuitry is configured to determine a single maximum output power parameter to be used for transmitting signals in at least two Transmission Time Intervals, TTI, based on a TTI configuration, the TTI configuration including a first TTI for operating a first signal between a first cell on a first carrier and the wireless device, and a second TTI for operating a second signal between the first cell on the first carrier and the wireless device, the TTI configuration including any of: the first TTI adjacent to the second TTI which do not overlap with each other in time; and the first TTI adjacent to the second TTI which at least partly overlap with each other in time. The circuitry is further configured to transmit, using the determined single maximum output power parameter, the first signal in the first TTI and the second signal in the second TTI.

According to one embodiment of this aspect, the single maximum output power parameter is based on a time length of the first TTI and a time length of the second TTI. According to one embodiment of this aspect, the first TTI and the second TTI have different time lengths. According to one embodiment of this aspect, the first TTI and the second TTI are each a shortened TTI of less than 1 ms that are included in a subframe, the subframe having two slots where each slot is 0.5 ms.

According to one embodiment of this aspect, the first TTI is subsequent in time to the second TTI. According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a method for a wireless device is provided. A single maximum output power parameter to be used for transmitting signals in at least two Transmission Time Intervals, TTI, based on a TTI configuration is determined. The TTI configuration includes a first TTI for operating a first signal between a first cell on a first carrier and the wireless device, and a second TTI for operating a second signal between the first cell on the first carrier and the wireless device, the TTI configuration including any of: the first TTI adjacent to the second TTI which do not overlap with each other in time; and the first TTI adjacent to the second TTI which at least partly overlap with each other in time. Using the determined single maximum output power parameter, the first signal is transmitted in the first TTI and the second signal is transmitted in the second TTI.

According to one embodiment of this aspect, the single maximum output power parameter is based on a time length of the first TTI and a time length of the second TTI. According to one embodiment of this aspect, the first TTI and the second TTI have different time lengths. According to one embodiment of this aspect, the first TTI and the second TTI are each a shortened TTI of less than 1 ms that are included in a subframe, the subframe having two slots where each slot is 0.5 ms. According to one embodiment of this aspect, the first TTI is subsequent in time to the second TTI.

According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a network node is provided. The network node includes a determining module configured to determine a Transmission Time Interval, TTI, configuration. The TTI configuration includes a first TTI for operating a first signal between a first cell on a first carrier and a wireless device, and a second TTI for operating a second signal between the first cell on the first carrier and the wireless device, the TTI configuration including any of: the first TTI adjacent to the second TTI which do not overlap with each other in time; and the first TTI adjacent to the second TTI which at least partly overlap with each other in time. The network node includes a receiving module configured to receive the first signal in the first TTI and the second signal in the second TTI, the first TTI and second TTI having been transmitted based on a maximum output power parameter, the single maximum output power parameter being based on the TTI configuration.

According to one aspect of the disclosure, a wireless device is provided. The wireless device includes a power determination module configured to determine a single maximum output power parameter to be used for transmitting signals in at least two Transmission Time Intervals, TTI, based on a TTI configuration. The TTI configuration includes a first TTI for operating a first signal between a first cell on a first carrier and the wireless device, and a second TTI for operating a second signal between the first cell on the first carrier and the wireless device, the TTI configuration including any of: the first TTI adjacent to the second TTI which do not overlap with each other in time; and the first TTI adjacent to the second TTI which at least partly overlap with each other in time. The wireless device includes a transmitting module configured to transmit, using the determined single maximum output power parameter, the first signal in the first TTI and the second signal in the second TTI.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 B illustrates an example of PCMAX estimation window for overlapping TTIs in 2-OS TTI pattern;

FIG. 12 C illustrates an example of PCMAX estimation window for overlapping TTIs in 4-OS TTI pattern;

DETAILED DESCRIPTION

Figure 1:
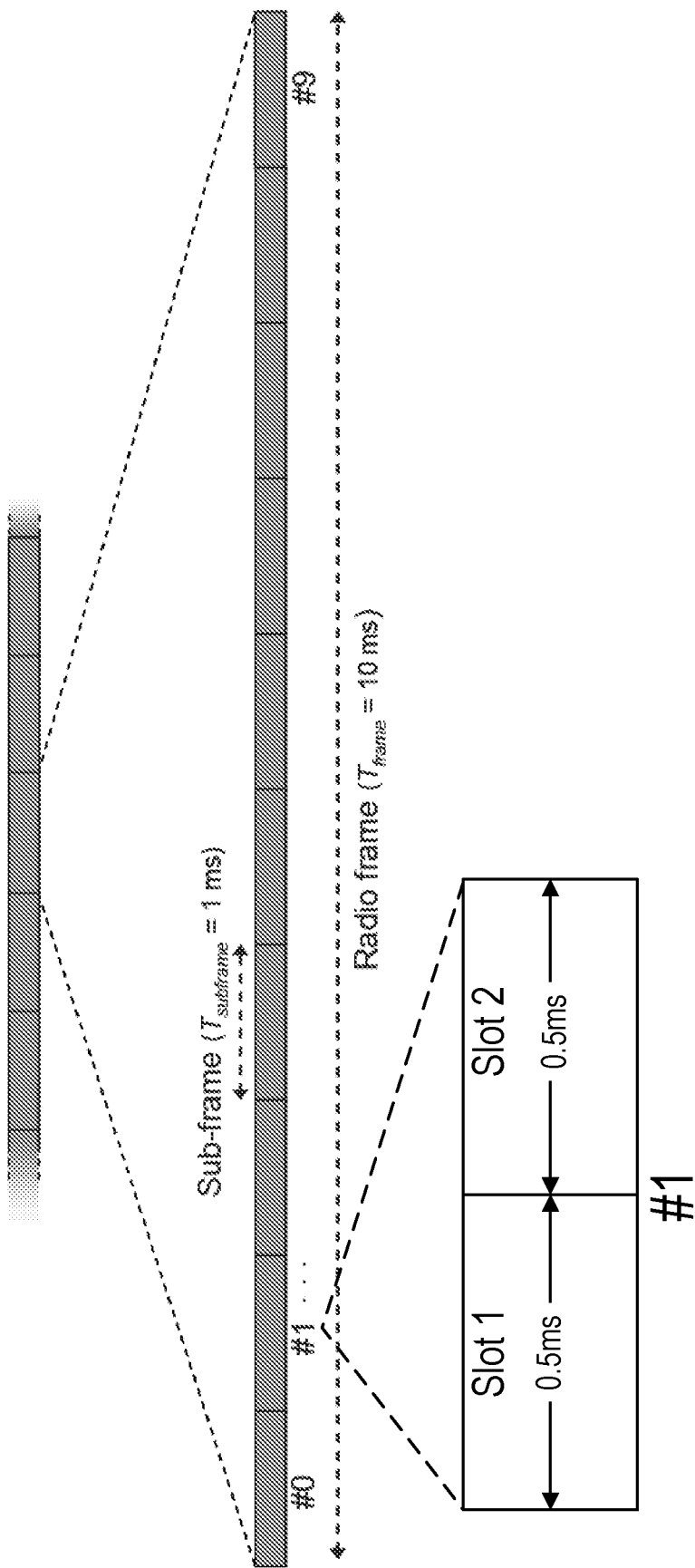
FIG. 1 illustrates an example LTE time-domain structure.
Figure 2:
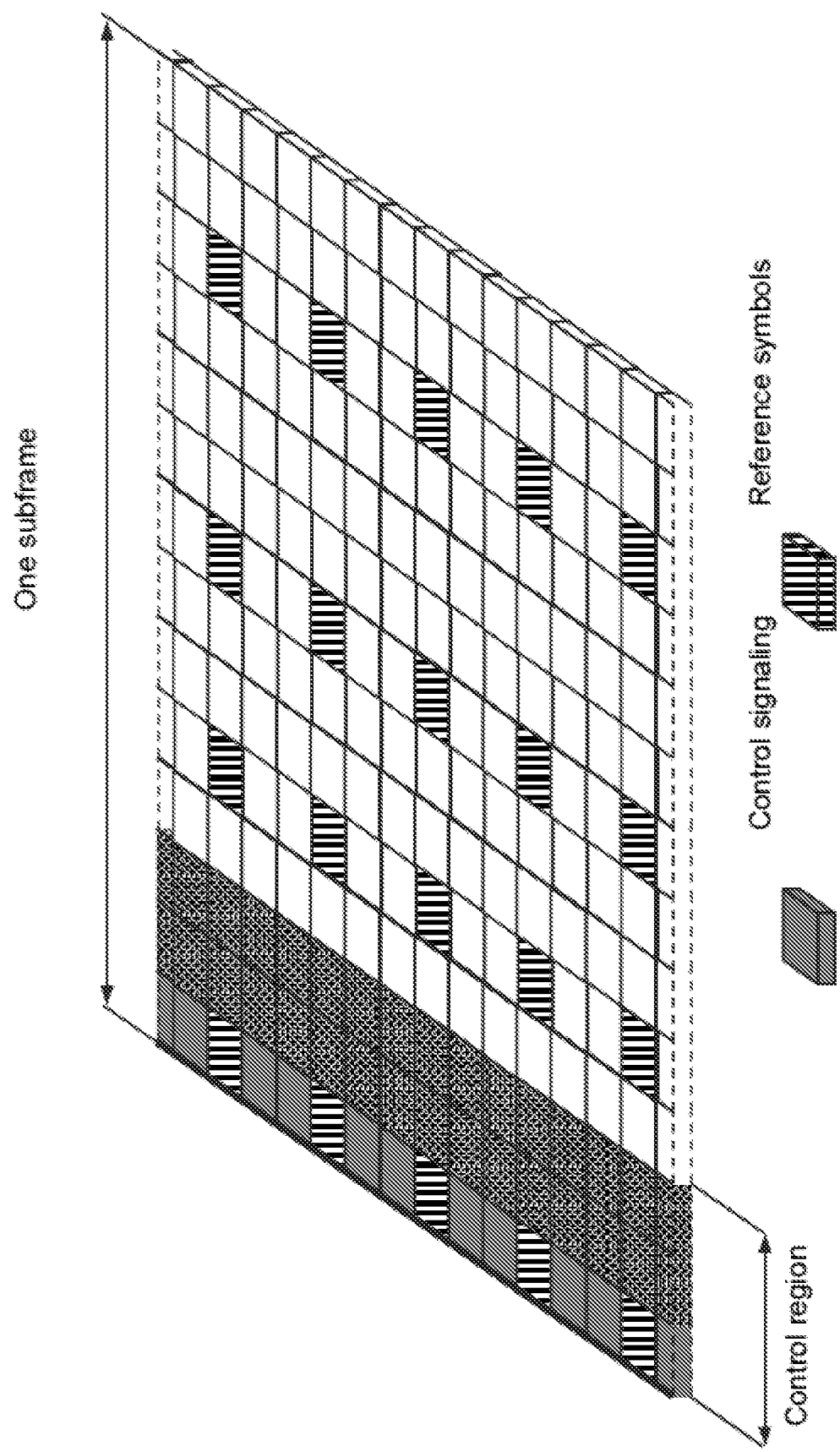
FIG. 2 illustrates an example downlink subframe.
Figure 3:
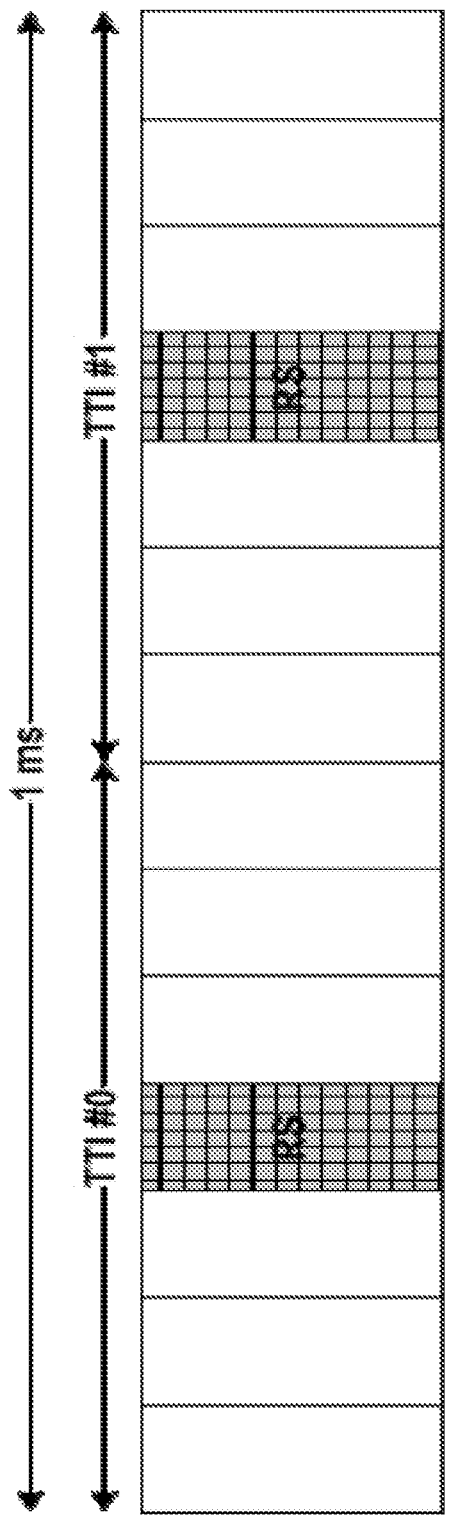
FIG. 3 illustrates an example 7-symbol sTTI structure supported for UL.
Figure 4:
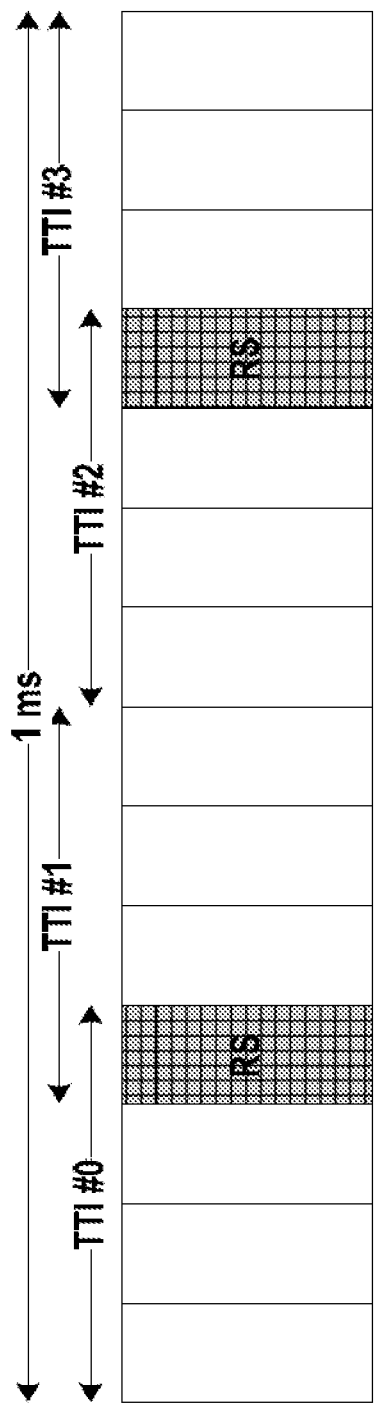
FIG. 4 illustrates an example, 4-symbol sTTI to be supported for UL.

Particular embodiments are described in FIGS. 1-16 of the drawings, like numerals being used for like and corresponding parts of the various drawings. FIG. 9 is a block diagram illustrating an embodiment of a network 100 for deriving configured output power with different transmission time interval (TTI) patterns, according to certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 9). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115 and wireless devices 110 are described in more detail with respect to FIGS. 14 and 10, respectively.

Although FIG. 9 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa. Likewise, the techniques for deriving configured output power for consecutive TTIs in shortened TTI patterns described herein are applicable to both LAA LTE and standalone LTE operation in license-exempt channels and are generally applicable for transmissions from both network nodes 115 and wireless devices 110.

In this disclosure, a first node and a second node are sometimes used as two nodes which are either transmitting or receiving in unlicensed spectrum (or a shared spectrum where more than one system operates based on some kind of sharing regulations). An example of a first node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT etc.

Another example of a node could be user equipment, this is a non-limiting term user equipment (UE) and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In this disclosure, any of the above mentioned nodes could become "the first node" and/or "the second node".

A component carrier (CC) also interchangeably called as carrier, PCC or SCC is configured at the wireless device by the network node using higher layer signaling. For example, a CC may be configured by sending a RRC configuration message to the wireless device. The configured CC may be used by the network node for serving the wireless device on the serving cell (e.g. on PCell, PSCell, SCell etc.) of the configured CC. The configured CC is also used by the wireless device for performing one or more radio measurements (e.g. RSRP, RSRQ etc.) on the cells operating on the CC e.g. PCell, SCell or PSCell and neighboring cells.

The term fallback mode refers herein to a carrier aggregation (CA) configuration which contains fewer CCs than the maximum number of CCs in a CA combination supported by the wireless device 110. For example a wireless device 110 supporting a CA combination with a maximum CA configuration of 4 DL CCs and 1 UL CC may support the following 3 fallback modes: 3 DL CCs and 1 UL CC, 1 DL CCs and 1 UL CC and DL CC and 1 UL CC (i.e. single carrier operation). The term fallback mode is also interchangeably called as lower order CA combination, lower order CA configuration, fallback CA mode, fallback CA configuration mode, fallback CA combination etc.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH, etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (TO) over which a physical channel can be encoded and interleaved for transmission. The physical channel is decoded by the receiver over the same time period (TO) over which it was encoded. The TTI may also interchangeably called as short TTI (sTTI), transmission time, transmission time interval, slot, sub-slot, mini-slot, short subframe (SSF), mini-subframe etc.

The term Pcmax used herein may correspond to any parameter defining UE maximum output power. In some embodiments Pcmax is denoted by P1. The parameter may be pre-defined or configured. The parameter may be equal to or less than the nominal output power of the UE. Pcmax is also interchangeably called herein as UE maximum transmit power, UE maximum configured power, UE maximum operating power etc.

The term requirements used herein may comprise any type of wireless device requirements related to wireless device measurements aka radio requirements, measurement requirements, RRM requirements, mobility requirements, positioning measurement requirements etc. Examples of wireless device requirements related to wireless device measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

Among others, the present disclosure describes:
A scenario involving different TTI patterns
Embodiments of method for a UE of determining maximum output power for consecutive TTIs and embodiments of UE's operable to implement such methods;
Embodiments of method for a network node of determining maximum output power for consecutive TTIs and embodiments of network nodes operable to implement such methods;

Description of a Scenarios Involving Different TTI Patterns

In certain embodiments, a wireless device 110 may be configured with different TTI patterns. In one example scenario, wireless device 110 may be configured with one serving cell (e.g. PCell) aka single carrier operation. Wireless device 110 may be capable of at least two different TTIs (e.g. TTI of 1 ms and TTI of 2-OS etc.). Wireless device 110 can be configured with any one of the plurality of TTIs supported by the wireless device 110 in one time resources in the serving cell. In certain embodiments, wireless device 110 may further be capable of supporting operation whereby the TTI is changed over time in the serving cell. Additionally or alternatively, wireless device 110 may further be capable of supporting operation using different TTI in uplink and downlink of the serving cell. An example of the basic scenario is described in Table 1:

| No. | Cases | Examples of TTI patterns |
|---|---|---|
| 1 | Same TTI pattern is used in a cell continuously | TTI = 2-OS is used in all time resources in cell 1 |
| 2 | Different TTI patterns are used in a cell in different time resources | TTI = 2-OS and TTI = 1 ms are used in different resources in cell 1. |
| 3 | Different TTI patterns are used in the UL and DL of the same cell | TTI = 2-OS is used in DL of cell 1 and TTI = 7-OS is used in UL of cell 1 |
| 4 | Any combination of cases 2 and 3 | TTI = 2-OS and TTI = 7-OS are used in different resources in DL of cell 1, whereas TTI = 7-OS is used in UL in all time resources in cell 1. |

Figure 10:
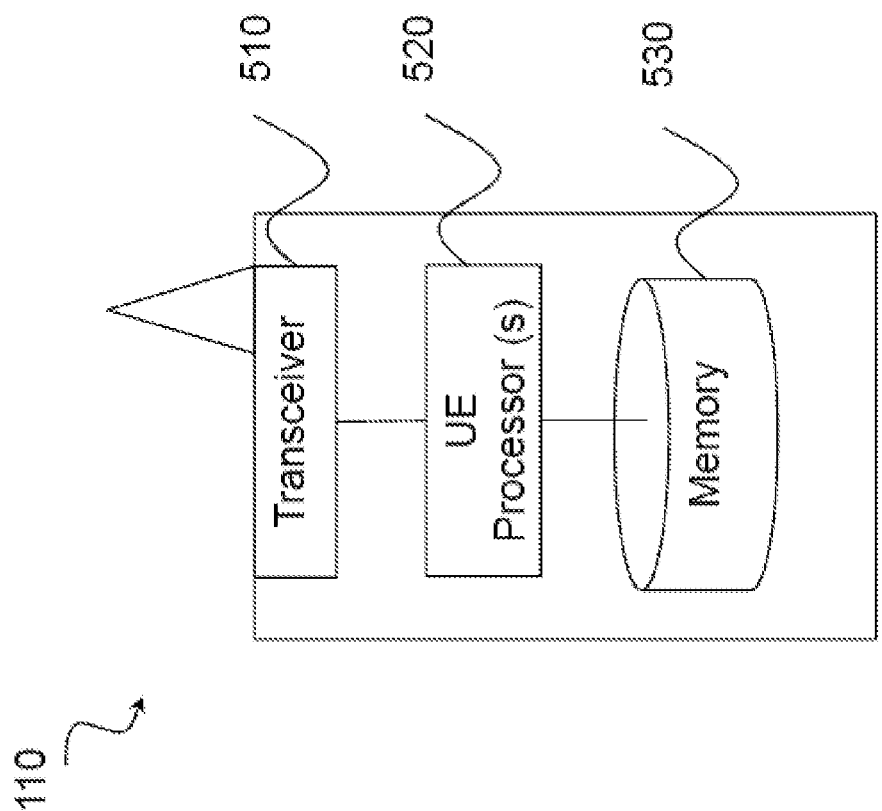
FIG. 10 illustrates an example wireless device for deriving configured output power for consecutive TTIs in shortened TTI patterns, according to certain embodiments.

FIG. 10 illustrates an example wireless device 110 for deriving configured output power for consecutive TTIs in shortened TTI patterns, in accordance with certain embodiments. As depicted, wireless device 110 includes transceiver 510, one or more processors 520, and memory 530. In some embodiments, transceiver 510 facilitates transmitting wireless signals to and receiving wireless signals from network node 115 (e.g., via an antenna), processor 520 executes instructions to provide some or all of the functionality described above as being provided by wireless device 110, and memory 530 stores the instructions executed by processor 520. Examples of a wireless device 110 are provided above.

The one or more processors 520 may include any suitable combination of hardware and software implemented in one or more modules to execute instructions and manipulate data to perform some or all of the described functions of wireless device 110. In some embodiments, the one or more processors 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above).

Figure 11:
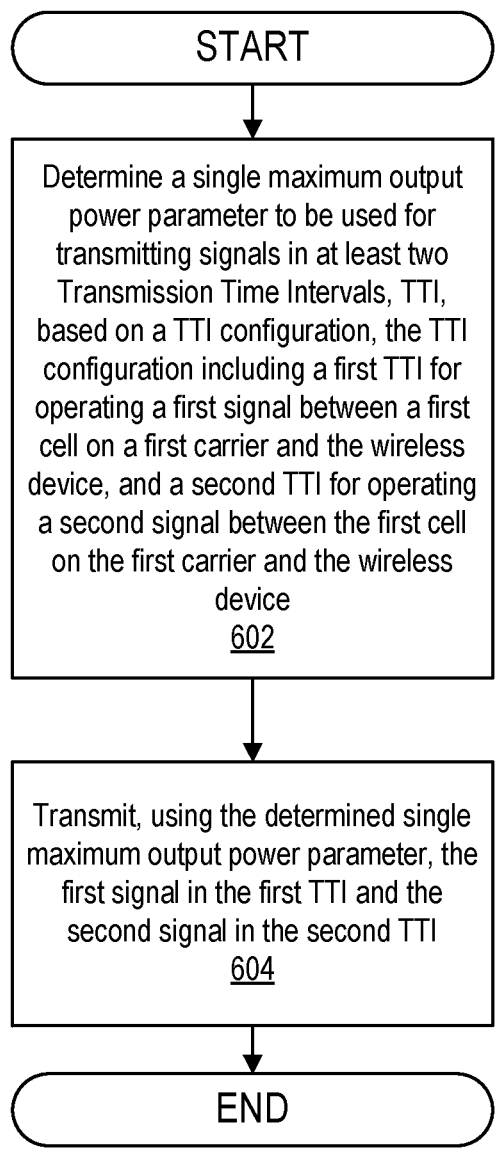
FIG. 11 illustrates an example method for a wireless device for deriving configured output power for consecutive TTIs in shortened TTI patterns, according to certain embodiments.

FIG. 11 illustrates an exemplary method 600 for wireless device 110 for deriving configured output power for consecutive TTIs in shortened TTI patterns, according to certain embodiments. The method begins at step 602, when wireless device 110 determines a single maximum output power parameter (P1) to be used for transmitting signals in at least two Transmission Time Intervals, TTI, based on a TTI configuration. In one or more embodiments, the TTI configuration includes a first TTI for operating a first signal between a first cell on a first carrier and the wireless device 110, and a second TTI for operating a second signal between the first cell on the first carrier and the wireless device 110. In one or more embodiments, the TTI configuration including any of: the first TTI adjacent to the second TTI which do not overlap with each other in time; and the first TTI adjacent to the second TTI which at least partly overlap with each other in time.

In one or more embodiments, network node 115 determines a TTI configuration (TTI-CONF) comprising a first TTI (TTI1) used for operating a first signal (S1) between a first cell (cell1) on a first carrier (F1) and the UE 110 and a second TTI (TTI2) used for operating a second signal (S2) between a first cell (cell1) on a first carrier (F1). In certain embodiments, TTI-CONF may be any of: a first TTI configuration (CONF1) comprising of adjacent TTI1 and TTI2 which don't overlap with each other in time, and a second TTI configuration (CONF2) comprising of adjacent TTI1 and TTI2 which at least partly overlap with each other in time. In certain embodiments, the determination of TTI-CONF may comprise obtaining TTI-CONF, such as based on a pre-defined rule or receiving from a network node 115 or another UE 110. In one or more embodiments, network node 115 transmits the TTI configuration to UE 110. For example, the wireless device 110 obtains or otherwise in one embodiment determines a TTI configuration (TTI-CONF) to be used by the wireless device 110 for at least transmitting signals in the serving cell of the wireless device 110.

The TTI-CONF comprises of two TTIs: a first TTI (TTI1) used for operating a first signal (S1) between a first cell (cell1) on a first carrier (F1) and the UE 110 and a second TTI (TTI2) used for operating a second signal (S2) between a first cell (cell1) on a first carrier (F1), where TTI1 and TTI2 are adjacent or consecutive TTIs in time. The cell1 can be a serving cell of the wireless device 110. Examples of serving cells are PCell, PSCell etc. Cell1 may correspond to UL serving cell. In this case TTI1 corresponds to the TTI of the UL serving cell.

The TTI-CONF may further comprise of any one of the at least two TTI configurations:
 a first TTI configuration (CONF1) comprising of adjacent or consecutive TTI1 and TTI2 which don't overlap with each other in time, and
 a second TTI configuration (CONF2) also comprising of adjacent or consecutive TTI1 and TTI2 which at least partly overlap with each other in time.

The TTI1 and TTI2 used herein may refer to at least TTIs used by the wireless device 110 for transmitting uplink signals in cell1. In one example the same TTI (e.g. TTI1)

may be used by the wireless device 110 for operating signals in both uplink and downlink of cell1. In another example, the different TTIs may be used by the wireless device 110 for operating signals in uplink and downlink of cell1 e.g. TTI1$u$ and TTI2$d$ in UL and DL respectively of cell1. The embodiments are applicable regardless of whether the same or different TTIs are used by the wireless device 110 in the same cell i.e. cell1.

The term CONF2 used herein comprises of at least TTI1 and TTI2 which at least partly overlap in time with each other. In other words, the wireless device 110 is configured with two successive or consecutive TTIs with at least one overlapping time resource (e.g. one symbol). TTI1 and TTI2 can be of the same length in time or they can of different length in time. In the latter case: in one example the leading TTI can be larger than the trailing TTI (i.e. TTI1>TTI2) while in second example the leading TTI can be smaller than the trailing TTI (i.e. TTI1<TTI2). The overlapping part of the two successive TTIs in time is typically one or more symbols containing a reference signal. Examples of reference signals are DMRS, SRS, etc. TTI-CONF may also interchangeably called as TTI configuration comprising of two consecutive TTIs with common DMRS, TTI configuration comprising of two consecutive TTIs with shared DMRS, TTI configuration comprising of two consecutive TTIs with common or overlapping symbol(s), TTI configuration comprising of two consecutive TTIs with common or overlapping symbol(s) containing reference signals, or simply TTI configuration with common or shared DMRS or reference signal or symbols etc.

The term operating signals (S1) between cell1 and the wireless device 110 herein may comprise of reception of signals (S11) by the wireless device from cell1 and/or transmission of signals (S12) by the wireless device 110 to cell1. Examples of S11 when receiving signals from cell1 at the wireless device 110 are DL channels such as PDCCH, PDSCH, sPDCCH, sPDSCH etc. Examples of S12 when transmitting signals by the wireless device 110 to cell1 are UL channels such as PUCCH, PUSCH, sPUCCH, sPUSCH etc.

The wireless device 110 may determine TTI1 and TTI2 comprised in the TTI-CONF based on one or more of the following mechanisms:
  pre-defined information e.g. relation between TTI1 and frequency band of F1 and/or between TTI2 and frequency band of F1.
  configuration received from the network node e.g. PCell, SCell etc. For example, the wireless device 110 may determine the TTI pattern used in any time instance in any carrier by receiving control signals in DL or by receiving the RRC message
  pre-defined rule. Examples of rules are:
    apply same TTI as used in a reference cell. Examples of reference cell is PCell, PSCell.
    Based on TTI used in the opposite direction of cell1 e.g.
      Assume same TTI in UL and DL cell1.
      Assume UL cell1 uses TTI which is not shorter than the TTI of the DL cell1
  autonomous determination e.g. blind detection by the wireless device 110 by attempting to decode DL channel of different pre-defined TTIs.

In one or more embodiments, of step 602, the wireless device 110 determines a single maximum output power parameter (P1) to be used by the UE for transmitting signals in two or more consecutive TTIs based on the determined TTI-CONF according to step 602. The estimation of P1 is done over a window or duration or an estimation period (Tw) which depends on at least at least one of the consecutive TTIs used by the UE for at least transmitting signals in its serving cell. The parameter Tw may also be called as reference time, reference TTI length or window, TTI reference (TTIref), Pcmax reference time, estimation period of max power etc.

More specifically the value Tw used for calculating or estimating P1 is a function of at least one of the TTIs used by the wireless device 110 in the UL of cell1. This is expressed by the following expression:

$$Tw=f(\text{number of TTIs in TTI-CONF}) \quad (1)$$

In another example Tw may be function of all TTIs in the TTI-CONF (e.g. TTI1 and TTI2) as expressed in (2). This applies to CONF1 and also CONF2.

$$Tw=f1(TTI1,TTI2) \quad (2)$$

In case the wireless device 110 is configured with CONF1, then in a specific example Tw can be expressed by (3):

$$Tw=TTI1+TTI1 \quad (3)$$

In case the wireless device 110 is configured with CONF2, then Tw can be expressed by general expression in (5):

$$Tw=f2(TTI1,TTI2,\Delta t) \quad (4)$$

Where $\Delta t$ is the time duration which is shared between TTI and TTI2 in time i.e. common between TTI1 and TTI2. For example, $\Delta t$ can be equal to the DMRS symbol if this is shared between TTI1 and TTI2.

In case the wireless device 110 is configured with CONF2, then in a specific example Tw can be expressed by (5):

$$Tw=TTI+TTI2-\Delta t \quad (5)$$

Where P1=f3(Tw)

For each determined TTI configuration (and not subframe as mentioned in TS 36.101 v14.1.0 section 6.2.5, publicly available at www.3GPP.org), the wireless device 110 determines $P_{CMAX\_L,c}$ for two or more consecutive TTIs and so PCMAX,$_c$ values, based on the specified requirements in TS 36.101 section 6.2.5.

In case TTI duration is smaller than 1 ms (i.e. less than 14-OS TTI), the PCMAX is calculated for the whole duration of TTI. Note that 1 ms TTI consists of 14 OFDM symbols (with normal cyclic prefix length). An example of the PCMAX calculation window for different TTIs is shown in table 2 below. In table 2 in all the cases it is assumed that the TTI configuration comprises of two consecutive TTIs. Therefore, in all cases (#1-5), the Pcmax calculation window (Tw) comprises of the time duration of TTI1 and TTI2. In exemplary cases #1 and #3 in table 2 the TTI-CONF comprises of two consecutive TTIs (TTI1 and TTI2) with one shared OFDM symbol (e.g. containing DMRS). In case #1 (4-OS of TTI) due to one shared symbol between TTI1 and TTI2, the Pcmax calculation window (Tw) comprises of 7-OS (i.e., 0.5 ms). In case #3 (2-OS of TTI) due to one shared symbol between TTI1 and TTI2, the Pcmax calculation window (Tw) comprises of 3-OS (i.e. 214.29 µs). But in case #3 (2-OS of each TTI) due to one shared symbol between TTI1 and TTI2, the Pcmax calculation window (Tw) comprises of 3-OS (i.e. 214.29 µs). Cases #4 and #5 are analogous to cases #2 and #3 respectively, except that in former cases the lengths of TTI1 and TTI2 are different.

TABLE 2

An example of minimum Pcmax calculation time window for different TTI pattern when two consecutive TTIs overlap in time

Figure 5:
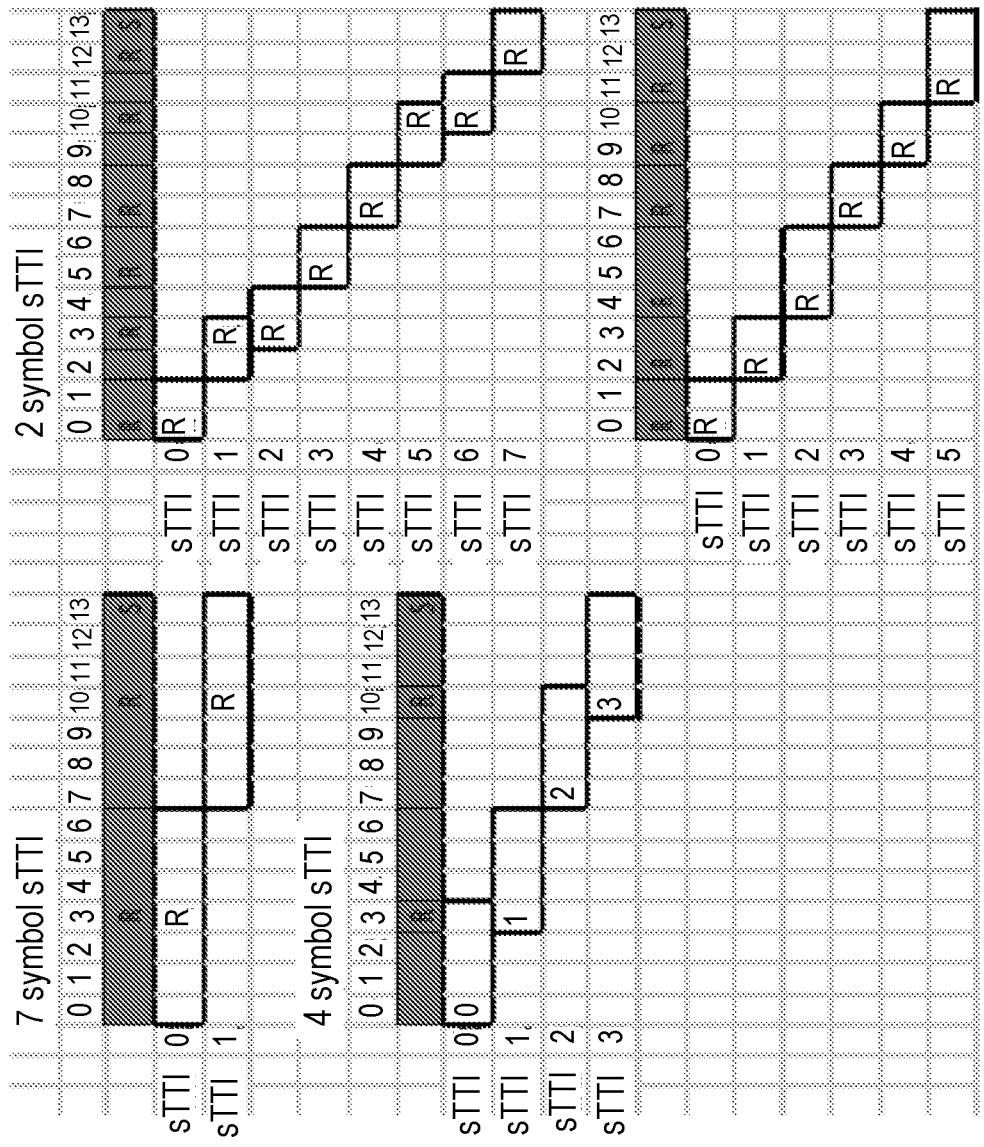
FIG. 5 illustrates an example of UL TTI options
Figure 6:
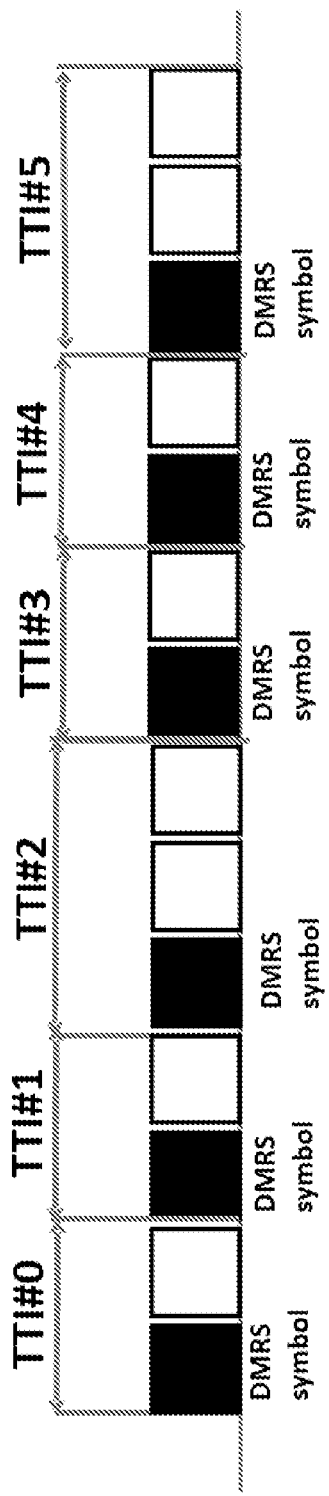
FIG. 6 illustrates an example of 2-OS TTI durations.
Figure 7:
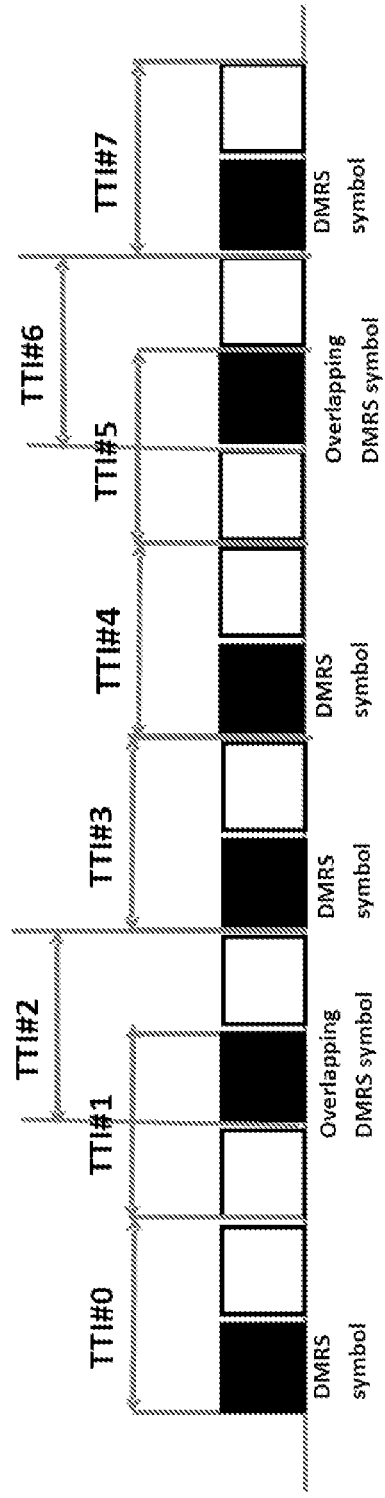
FIG. 7 illustrates overlapping TTIs for 2-OS TTI length when the overlapping symbol is common DMRS symbol.
Figure 8:
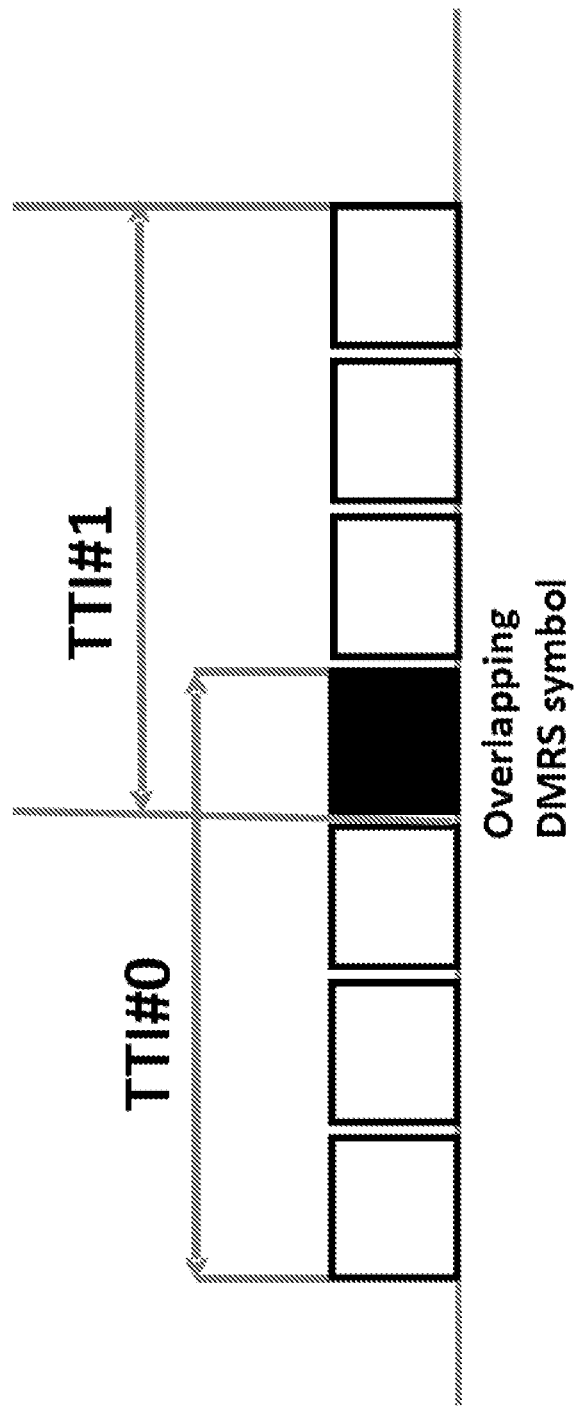
FIG. 8 illustrates overlapping TTIs for 4-OS TTI length when the overlapping symbol is common DMRS symbol.
Figure 9:
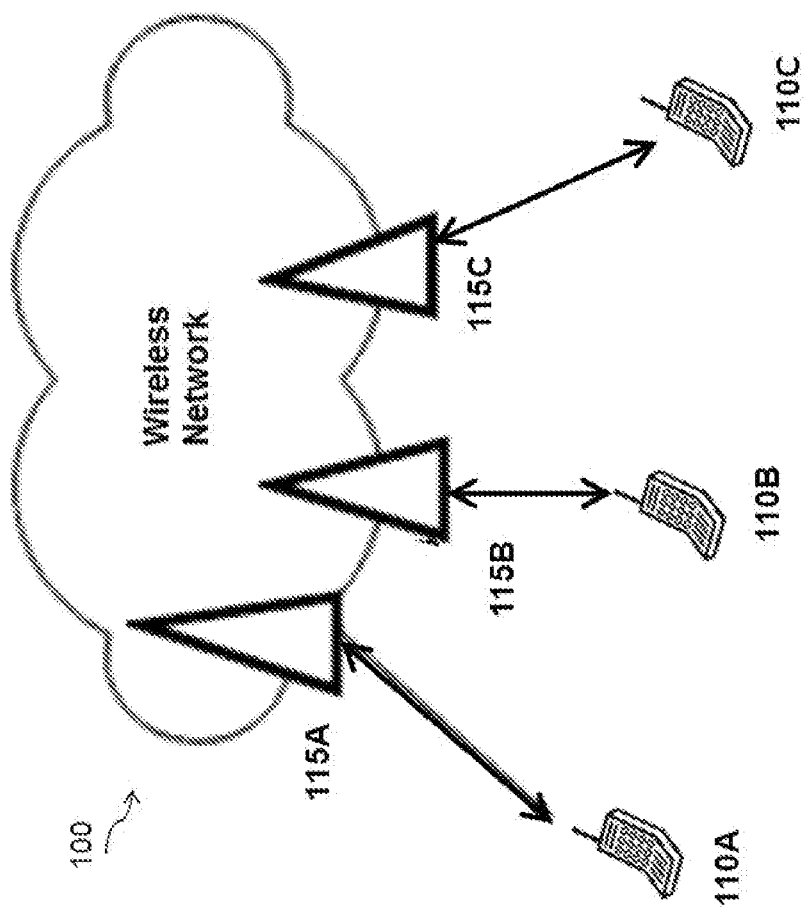
FIG. 9 illustrates an example network for deriving configured output power for consecutive TTIs in shortened TTI patterns, according to certain embodiments.

| Case | TTI Pattern | TTI duration | Overlapping TTIs | Minimum PCMAX calculation window (Tw) |
|---|---|---|---|---|
| 1 | 4OS | 285.71 μs | Yes [DMRS overlapped as shown in FIG. 5 and FIG. 8] (CONF2) | 500 μs |
| 2 | 2OS | 142.86 μs | No (CONF1) | 285.73 μs |
| 3 | 2OS | 142.86 μs | Yes [DMRS overlapped as shown in FIG. 5 and FIG. 7] (CONF2) | 214.29 μs |
| 4 | TTI1 = 2-OS; TTI2 = 3-OS | TTI1 = 142.86 μs; TTI2 = 214.28 μs | No (CONF1) | 357.14 μs |
| 5 | TTI1 = 2-OS; TTI2 = 3-OS | TTI1 = 142.86 μs; TTI2 = 214.28 μs | Yes with overlapping/ shared DMRS (CONF2) | 285.71 μs |

Figure 12A:
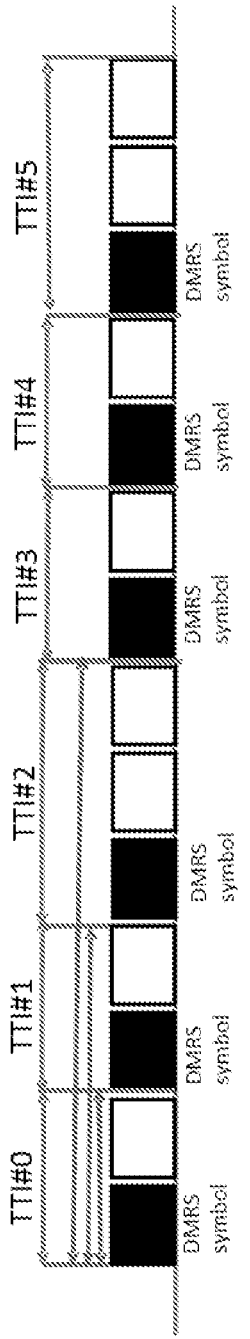
FIG. 12 A illustrates an example of PCMAX estimation window for non-overlapping TTIs in 2-OS TTI pattern.
Figure 12B:
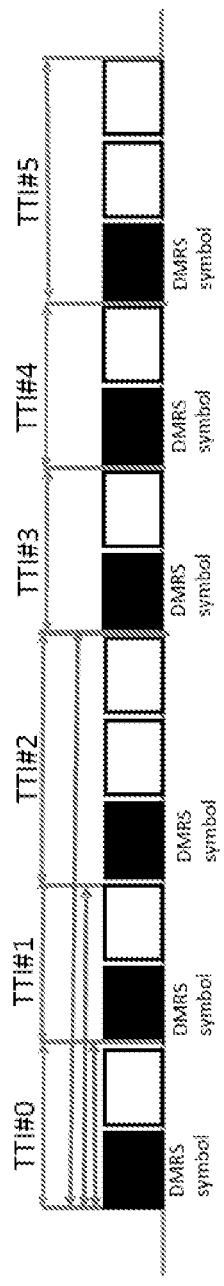
Figure 12C:
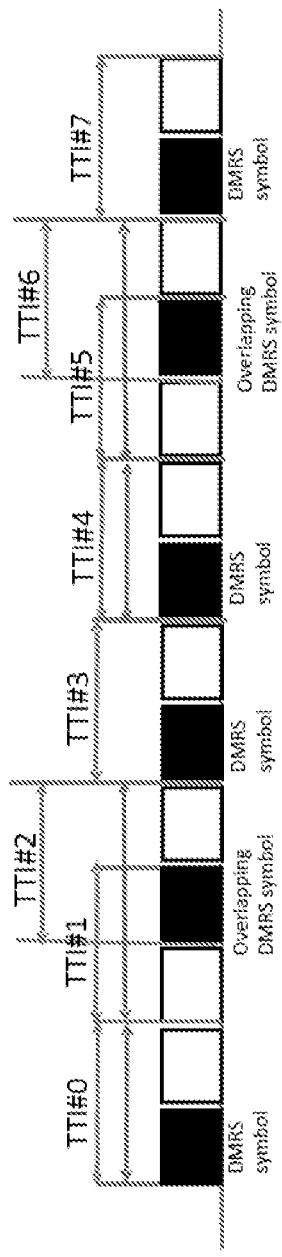

The table or relation mapping or relating the values of TTI and the corresponding Pcmax parameters can be obtained by the wireless device 110 based on one or more of the following principles:

Based on pre-defined rule e.g. pre-defined requirement in the specification,

By receiving it from the network node 115 or from another wireless device 110,

By autonomous selection by the wireless device 110 e.g. based on historical data or statistics, Based on reception performance of UL signals in cell1 e.g. if received signal quality is below a threshold then the wireless device 110 may adjust its PCMAX window as function of the TTI i.e. adjustment may depend in the current TTI, The above examples are shown in FIGS. 12A-12C.

The total configured maximum output power PCMAX shall be set within the following bounds:

$$P_{CMAX\_L} \leq P_{CMAX} \leq P_{CMAX\_H}$$

Where PCMAX estimation time window consists of a total of m TTIs, and $P_{CMAX\_L}$ and $P_{CMAX\_H}$ are defined as below:

$$P_{CMAX\_L} = \text{MIN}\{P_{CMAX\_L,1}(\text{TTI}(n)), P_{CMAX\_L,1}(\text{TTI}(n+1)), \ldots, P_{CMAX\_L,1}(\text{TTI}(n+m)), P_{PowereClass}\}$$

$$P_{CMAX\_H} = \text{MIN}\{P_{CMAX\_H,1}(\text{TTI}(n)), P_{CMAX\_H,1}(\text{TTI}(n+1)), \ldots, P_{CMAX\_H,1}(\text{TTI}(n+m)), P_{PowereClass}\}$$

Here, the above mentioned PCMAX is applied to the TTIs, i.e. to the TTI(n) to TTI(n+m) in cell1. $P_{CMAX\_L,a(b)}$ and $P_{CMAX\_H,a(b)}$ are the $P_{CMAX,c}$ lower and higher limit respectively for cell a on TTI b.

The number m can be defined by one or more of the following:

It can be decided by the wireless device 110, as a function of TTI duration, e.g. m=f(TTI). As an example: for 2-OS TTI, m can be larger than 2.

m can be signaled to the wireless device 110 from the network m can be equal to the time window of the time mask that is used for transmitting signals over two or more consecutive TTIs.

autonomous determination by the wireless device 110 e.g. blind detection by the wireless device 110 by attempting to decode DL channel of different pre-define TTIs.

Based on UL resource allocation information provided by the network node to the wireless device 110

Based on history or statistics from previous transmissions

At step 604, the wireless device 110 uses the determined maximum output power value (P1) associated with the determined TTI configuration (CONF1 or CONF2) for transmitting signals to cell1. In one or more embodiments, wireless device 110 transmits, using the determined single maximum output power parameter, the first signal in the first TTI and the second signal in the second TTI. Wireless device 110 transmits signals S1 and S2 (or more signals) to cell1 in two (or more) consecutive TTIs according to TTI-CONF based on the determined maximum output power parameter (P1). The wireless device 110, based on the determined value of P1 ensures that its maximum output power remains within the value, P1. The wireless device 110, based on the determined value of P1 further ensures that its maximum output power remains within the value, P1 when the TTI over which it transmits the signal is the same as when P1 was estimated by the UE 110.

In one or more embodiments, wireless device 110 uses the determined maximum output power (P1) value in step-3 for one or more operational tasks. Examples of tasks are:

performing radio measurements on at least the transmitted signals, scheduling signals in the uplink, power control, positioning etc.

Figure 13:
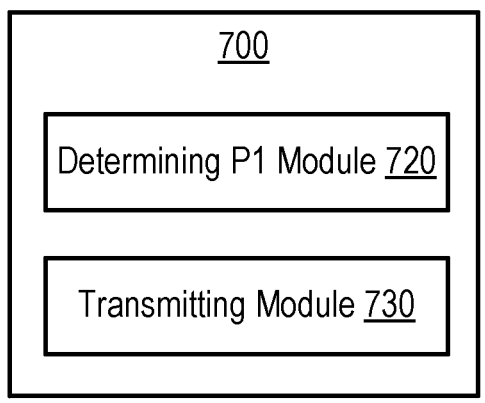
FIG. 13 illustrates an example virtual computing device for deriving configured output power for consecutive TTIs in shortened TTI patterns, according to certain embodiments.

In certain embodiments, the method for deriving configured output power for consecutive TTIs in shortened TTI patterns as described above may be performed by a virtual computing device. FIG. 13 illustrates an example virtual computing device 700 for deriving configured output power for consecutive TTIs in shortened TTI patterns, according to certain embodiments. In certain embodiments, virtual computing device 700 may include modules for performing steps similar to those described above with regard to the method illustrated and described in FIG. 11. For example, virtual computing device 700 may include at least one determining P1 module 720 and at least one transmitting module 730, and any other suitable modules for deriving configured output power for consecutive TTIs in shortened TTI patterns. In one or more embodiments, virtual computing device 700 includes determining TTI-CONF module. Alternatively, TTI-CONF module is included in network node 115. In some embodiments, one or more of the modules may be implemented using one or more processors 520 of FIG. 10. In certain embodiments, the functions of two or more of the various modules may be combined into a single module.

In one or more embodiments, wireless device 110 includes a determining TTI-CONF module that may perform the determining TTI-CONF functions of virtual computing device 700. For example, in a particular embodiment, determining TTI-CONF module may perform functions according to Step 302 in FIG. 15.

The determining P1 module 720 may perform the determining P1 functions of virtual computing device 700. For example, in a particular embodiment, determining P1 module 720 may perform functions according to Step 602 in FIG. 11.

The transmitting module 730 may perform the transmitting functions of virtual computing device 700. For example, in a particular embodiment, transmitting module 730 may perform functions according to Step 604 in FIG. 11. In one or more embodiments, transmitting module 730 is configured to use the determined P1 for one or more radio operational tasks (e.g. for measurements, etc.)

Other embodiments of virtual computing device 700 may include additional components beyond those shown in FIG. 13 that may be responsible for providing certain aspects of the radio node's functionality, including any of the functionality described above and/or any additional functionality (including any functionality necessary to support the solutions described above). The various different types of wireless devices 110 and network nodes 115 may include components having the same physical hardware but configured (e.g., via programming) to support different radio access technologies, or may represent partly or entirely different physical components.

Figure 14:
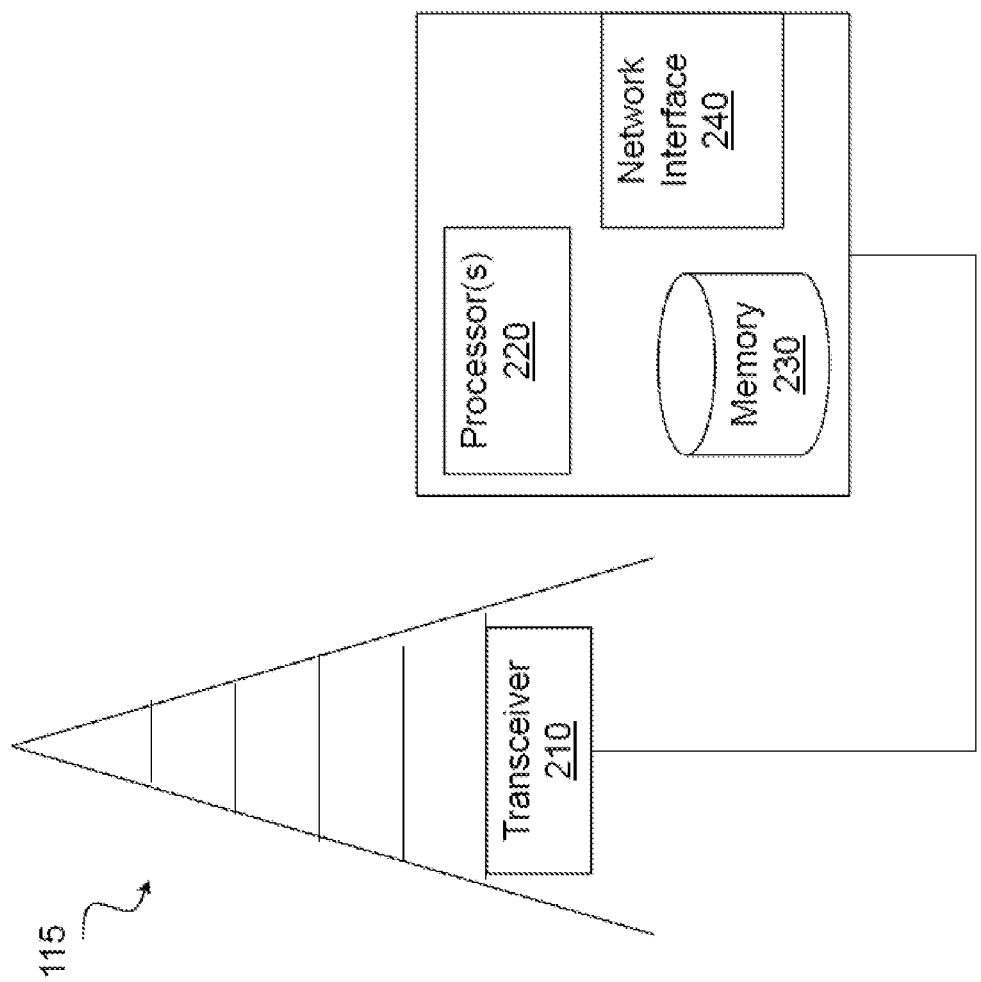
FIG. 14 illustrates an example network node for deriving configured output power for consecutive TTIs in shortened TTI patterns, according to certain embodiments.

FIG. 14 illustrate an example network node 115 for deriving configured output power for consecutive TTIs in shortened TTI patterns, according to certain embodiments. As described above, network node 115 may be any type of radio network node or any network node that communicates with a wireless device 110 and/or with another network node 115. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, one or more processors 220, memory 230, and network interface 240. In some embodiments, transceiver 210 facilitates transmitting wireless signals to and receiving wireless signals from wireless device 110 (e.g., via an antenna), the one or more processors 220 execute instructions to provide some or all of the functionality described above as being provided by a network node 115, memory 230 stores the instructions executed by the one or more processors 220, and network interface 240 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

The one or more processors 220 may include any suitable combination of hardware and software implemented in one or more modules to execute instructions and manipulate data to perform some or all of the described functions of network node 115. In some embodiments, the one or more processors 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to the one or more processors 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 14 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 15:
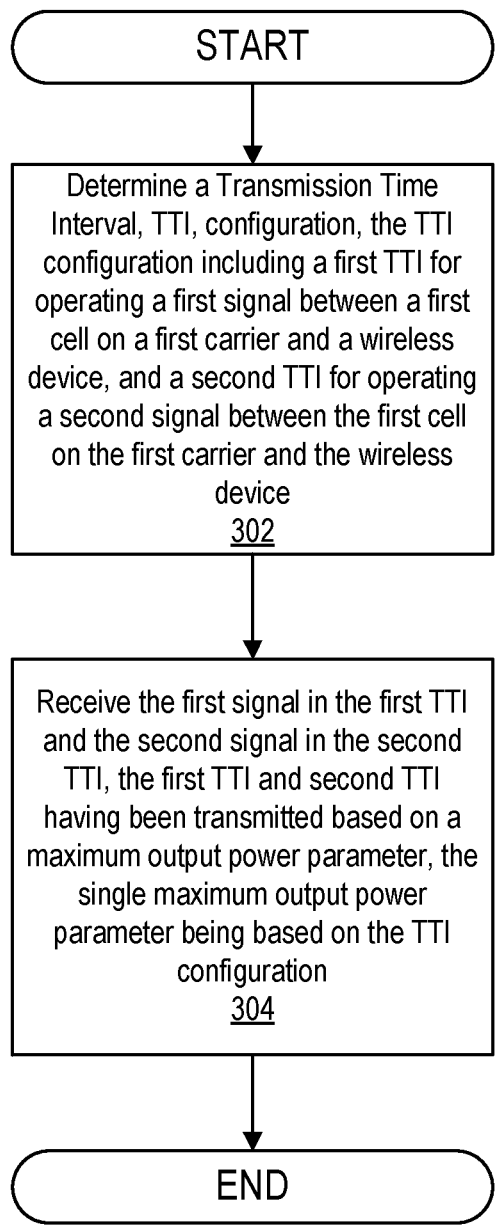
FIG. 15 illustrates an example method for a network node for deriving configured output power for consecutive TTIs in shortened TTI patterns, according to certain embodiments.

FIG. 15 illustrates an exemplary method 300 for a network node 115 for deriving configured output power for consecutive TTIs in shortened TTI patterns, according to certain embodiments. The method begins at step 302, when network node 115 determines a wireless device with a TTI configuration (TTI-CONF) comprising of a first TTI (TTI1) used for operating a first signal (S1) between a first cell (cell1) on a first carrier (F1) and the wireless device 110 and a second TTI (TTI2) used for operating a second signal (S2) between a first cell (cell1) on a first carrier (F1), wherein TTI-CONF is any of: a first TTI configuration (CONF1) comprising of adjacent TTI1 and TTI2 which don't overlap with each other in time, and a second TTI configuration (CONF2) comprising of adjacent TTI1 and TTI2 which at least partly overlap with each other in time. The TTI configuration (TTI-CONF) may be performed by transmitting a message to UE e.g. RRC message. Network node 115 may then configure wireless device 110 based on the determined TTI configuration.

The TTI-CONF may further comprise of any one of the at least two TTI configurations:
  a first TTI configuration (CONF1) comprising of adjacent or consecutive TTI1 and TTI2 which do not overlap with each other in time, and
  a second TTI configuration (CONF2) also comprising of adjacent or consecutive TTI1 and TTI2 which at least partly overlap with each other in time.

The example of CONF1 and CONF2 given in section 5.3.1 (UE embodiment) are also applicable for the network node 115.

In one or more embodiments, the network node 115 may determine the value of TTI1 and TTI2 or the need to configure TTI1 and TTI2 i.e. specific value. The network node 115 may determine the value of TTI1 and TTI2 based on for example one or more of the following principles:

- wireless device's capability whether it supports two or more different TTIs e.g. TTI=1 ms and TTI=0.14 ms.
- The required wireless device's bit rate.
- The round trip time (RTT) required to deliver data packet between wireless device 110 and the network node 115 e.g. shorter TTI is used in case shorter RTT is required.
- The wireless device's location with respect to the serving cell. For example, shorter TTI is used if the wireless device's is closed to the serving cell e.g. close to the network node serving cell1.

The network node 115 may determine whether to configure the wireless device 110 with CONF1 or with CONF2. The network node 115 can determine whether to configure the wireless device 110 with CONF1 or with CONF2 for operating signals in cell1 based on any of the following mechanisms:

- Wireless device 110 transmitter characteristics e.g. the TTI-CONF which would lead to lower emissions or interference across TTI1 and TTI2.
- Expected or target signal quality at the network node 115 receiver for receiving signals from the wireless device 110 in cell1.
- Whether the network node 115 wants to use DMRS for estimating UL signal quality and using it for scheduling.
- Wireless device 110 coverage e.g. path loss between the UE and the base station serving cell1.
- Wireless device power class e.g. maximum output power (e.g. 23 dBm).
- Deployment scenario e.g. cell size, cell range etc.
- Uplink bit rate or throughput e.g. TTI-CONF that leads to better throughput is used by the network node.
- History or statistics of TTI-CONF used by the network node 115.

In one or more embodiments, wireless device 110 uses the TTI configuration to determine a wireless device's maximum output power parameter (P1) for two or more consecutive TTIs (TTI1 and TTI2) based on the configured values of TTI1 and TTI2, as described herein. The parameter P1 is used by the wireless device 110 for transmitting UL signals in cell1 for two of more consecutive TTIs: TTI1 and TTI2.

The wireless device 110 may determine the value of P1 based on a relation or mapping between TTIs and the maximum out power parameters. The mapping contains at least two TTIs and the corresponding two values of the windows (Tw) for estimating the corresponding values of the maximum output power. The wireless device 110 may determine the value of P1 using the same principles as described with respect to step 602 in FIG. 11.

At step 304, network node 115 receives the first signal in the first TTI and the second signal in the second TTI, the first TTI and second TTI having been transmitted based on a maximum output power parameter, the single maximum output power parameter being based on the TTI configuration. In one or more embodiments, the network node 115 receives the first signal in a first cell based on the determined receiving signals S1 and S2 (or more signals) in cell1 in two (or more) consecutive TTIs according to TTI-CONF from the wireless device 110 based on the determined maximum output power parameter (P1). The network node 115 may further adapt its receiver configuration base on the value of P1 for two or more consecutive TTIs. For example, if P1 used by the wireless device 110 for transmitting signals to cell1 is estimated by the wireless device 110 over a time window smaller than a threshold (e.g. 300 μs), then the network node 115 may use more robust receiver for receiving S1. But if the value of P1 used by the wireless device 110 for transmitting signals to cell1 is estimated by the wireless device 110 over a time window not smaller than a threshold (e.g. 300 μs), then the network node 115 may use less robust receiver for receiving S1. A more robust receiver mitigates interference more effectively compared to the receiver which is less robust. However former receiver (which is more robust) may consume more power and requires more processing and complex operations compared to the latter receiver type.

The adaptation of the receiver type may enable the network node to enhance the wireless device coverage.

In one or more embodiments, the network node 115 uses the received signal and/or the determined value of P1 for one or more operational tasks. Examples of operational tasks are:

- performing radio measurements in the network node 115,
- adapting TTI of the UE in DL and/or in U in cell1,
- adapting TTI of the UE in cell1 in different time resources,
- power control operation of the UE in cell1,
- transmitting information about the determined value of P1 and/or Tw to other nodes.

Figure 16:
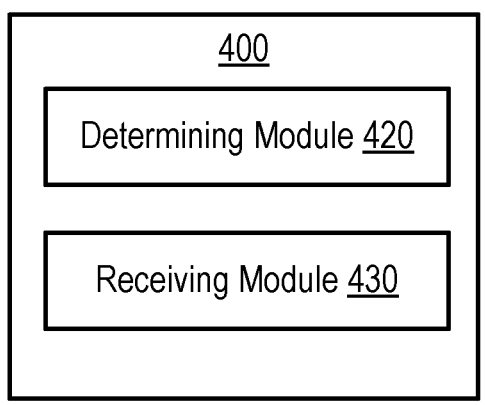
FIG. 16 illustrates another example virtual computing device for deriving configured output power for consecutive TTIs in shortened TTI patterns, according to certain embodiments.

In certain embodiments, the method for deriving configured output power for consecutive TTIs in shortened TTI patterns as described above may be performed by a virtual computing device. FIG. 16 illustrates an example virtual computing device 400 for deriving configured output power for consecutive TTIs in shortened TTI patterns, according to certain embodiments. In certain embodiments, virtual computing device 400 may include modules for performing steps similar to those described above with regard to the method illustrated and described in FIG. 15. For example, virtual computing device 400 may include at least one configuring module, at least one determining module 420, at least one receiving module 430, and any other suitable modules for deriving configured output power for consecutive TTIs in shortened TTI patterns. In some embodiments, one or more of the modules may be implemented using one or more processors 220 of FIG. 14. In certain embodiments, the functions of two or more of the various modules may be combined into a single module.

The determining module 420 may perform the determining functions of virtual computing device 400. For example, in a particular embodiment, determining module 420 may perform functions according to Step 302 in FIG. 15.

In one or more embodiments, virtual computing device 400 includes a configuring module that may perform the configuring wireless device 110 based on the determined TTI configuration as described herein.

The receiving module 430 may perform the receiving functions of virtual computing device 400. For example, in a particular embodiment, receiving module 430 may perform functions according to Step 304 in FIG. 15.

In one or more embodiments, virtual computing device 400 is configured to use the received signal and/or the determined value of P1 for one or more operational tasks.

Other embodiments of virtual computing device 400 may include additional components beyond those shown in FIG. 16 that may be responsible for providing certain aspects of the radio node's functionality, including any of the functionality described above and/or any additional functionality (including any functionality necessary to support the solutions described above). The various different types of wireless devices 110 and network nodes 115 may include components having the same physical hardware but configured (e.g., via programming) to support different radio access technologies, or may represent partly or entirely different physical components.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the described embodiments.

Some Embodiments

According to one aspect of the disclosure, a network node 115 is provided. The network node 115 includes circuitry. The circuitry is configured to determine a Transmission Time Interval, TTI, configuration, the TTI configuration including a first TTI for operating a first signal between a first cell on a first carrier and a wireless device 110, and a second TTI for operating a second signal between the first cell on the first carrier and the wireless device 110, the TTI configuration including any of: the first TTI adjacent to the second TTI which do not overlap with each other in time; and the first TTI adjacent to the second TTI which at least partly overlap with each other in time. The circuitry is further configured to receive the first signal in the first TTI and the second signal in the second TTI, the first TTI and second TTI having been transmitted based on a maximum output power parameter, the single maximum output power parameter being based on the TTI configuration.

According to one embodiment of this aspect, the first TTI and the second TTI have different time lengths. According to one embodiment of this aspect, the single maximum output power parameter is based on the time lengths of the first TTI and the second TTI. According to one embodiment of this aspect, the first TTI and the second TTI are each a shortened TTI of less than 1 ms that are included in a subframe, the subframe having two slots where each slot is 0.5 ms.

According to one embodiment of this aspect, the first TTI is subsequent in time to the second TTI. According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a method for a network node 115 is provided. A Transmission Time Interval, TTI, configuration is determined. The TTI configuration includes a first TTI for operating a first signal between a first cell on a first carrier and a wireless device 110, and a second TTI for operating a second signal between the first cell on the first carrier and the wireless device 110, the TTI configuration including any of: the first TTI adjacent to the second TTI which do not overlap with each other in time; and the first TTI adjacent to the second TTI which at least partly overlap with each other in time. The first signal in the first TTI and the second signal in the second TTI are received, the first TTI and second TTI having been transmitted using a maximum output power, the maximum output power being based on the TTI configuration.

According to one embodiment of this aspect, the first TTI and the second TTI have different time lengths. According to one embodiment of this aspect, the maximum output power is based on the time lengths of the first TTI and the second TTI. According to one embodiment of this aspect, the first TTI and the second TTI are each a shortened TTI of less than 1 ms that are included in a subframe, the subframe having two slots where each slot is 0.5 ms.

According to one embodiment of this aspect, the first TTI is subsequent in time to the second TTI. According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a wireless device 110 comprising circuitry is provided. The circuitry is configured to determine a single maximum output power parameter to be used for transmitting signals in at least two Transmission Time Intervals, TTI, based on a TTI configuration, the TTI configuration including a first TTI for operating a first signal between a first cell on a first carrier and the wireless device 110, and a second TTI for operating a second signal between the first cell on the first carrier and the wireless device 110, the TTI configuration including any of: the first TTI adjacent to the second TTI which do not overlap with each other in time; and the first TTI adjacent to the second TTI which at least partly overlap with each other in time. The circuitry is further configured to transmit, using the determined single maximum output power parameter, the first signal in the first TTI and the second signal in the second TTI.

According to one embodiment of this aspect, the single maximum output power parameter is based on a time length of the first TTI and a time length of the second TTI. According to one embodiment of this aspect, the first TTI and the second TTI have different time lengths. According to one embodiment of this aspect, the first TTI and the second TTI are each a shortened TTI of less than 1 ms that are included in a subframe, the subframe having two slots where each slot is 0.5 ms.

According to one embodiment of this aspect, the first TTI is subsequent in time to the second TTI. According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a method for a wireless device 110 is provided. A single maximum output power parameter to be used for transmitting signals in at least two Transmission Time Intervals, TTI, based on a TTI configuration is determined. The TTI configuration includes a first TTI for operating a first signal between a first cell on a first carrier and the wireless device 110, and a second TTI for operating a second signal between the first cell on the first carrier and the wireless device 110, the TTI configuration including any of: the first TTI adjacent to the second TTI which do not overlap with each other in time; and the first TTI adjacent to the second TTI which at least partly overlap with each other in time. Using the determined single maximum output power parameter, the first signal is transmitted in the first TTI and the second signal is transmitted in the second TTI.

According to one embodiment of this aspect, the single maximum output power parameter is based on a time length of the first TTI and a time length of the second TTI. According to one embodiment of this aspect, the first TTI and the second TTI have different time lengths. According to one embodiment of this aspect, the first TTI and the second TTI are each a shortened TTI of less than 1 ms that are included in a subframe, the subframe having two slots where each slot is 0.5 ms. According to one embodiment of this aspect, the first TTI is subsequent in time to the second TTI.

According to one embodiment of this aspect, the first TTI and the second TTI have a common Demodulation Reference Signal, DMRS. According to one embodiment of this aspect, the first TTI includes one taken from a group of 2 Orthogonal Frequency Division Multiplexing (OFDM) symbols, 3 OFDM symbols, 4 OFDM symbols and 7 OFDM symbols.

According to one aspect of the disclosure, a network node 115 is provided. The network node 115 includes a determining module configured to determine a Transmission Time Interval, TTI, configuration. The TTI configuration includes a first TTI for operating a first signal between a first cell on a first carrier and a wireless device 110, and a second TTI for operating a second signal between the first cell on the first carrier and the wireless device 110, the TTI configuration including any of: the first TTI adjacent to the second TTI which do not overlap with each other in time; and the first TTI adjacent to the second TTI which at least partly overlap with each other in time. The network node 115 includes a receiving module configured to receive the first signal in the first TTI and the second signal in the second TTI, the first TTI and second TTI having been transmitted based on a maximum output power parameter, the single maximum output power parameter being based on the TTI configuration.

According to one aspect of the disclosure, a wireless device 110 is provided. The wireless device 110 includes a power determination module configured to determine a single maximum output power parameter to be used for transmitting signals in at least two Transmission Time Intervals, TTI, based on a TTI configuration. The TTI configuration includes a first TTI for operating a first signal between a first cell on a first carrier and the wireless device 110, and a second TTI for operating a second signal between the first cell on the first carrier and the wireless device 110, the TTI configuration including any of: the first TTI adjacent to the second TTI which do not overlap with each other in time; and the first TTI adjacent to the second TTI which at least partly overlap with each other in time. The wireless device 110 includes a transmitting module configured to transmit, using the determined single maximum output power parameter, the first signal in the first TTI and the second signal in the second TTI.

At least some of the following abbreviations may be used in this disclosure.
1×RTT CDMA2000 1× Radio Transmission Technology
3GPP Third Generation Partnership Project
ABS Almost Blank Subframe
ARQ Automatic Repeat Request
AWGN Additive White Gaussian Noise
BCCH Broadcast Control Channel
BCH Broadcast Channel
BS Base Station
CA Carrier Aggregation
CC Carrier Component
CCCH SDU Common Control Channel SDU
CDMA Code Division Multiplexing Access
CGI Cell Global Identifier
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DRX Discontinuous Reception
DTX Discontinuous Transmission
DTCH Dedicated Traffic Channel
DUT Device Under Test
DwPTS Downlink Pilot Time Slot
E-CID Enhanced Cell-ID (positioning method)
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
GERAN GSM EDGE Radio Access Network
gNB Next Generation eNB
GP Guard Period
GSM Global System for Mobile communication
HARQ Hybrid Automatic Repeat Request
HO Handover
HSPA High Speed Packet Access
HRPD High Rate Packet Data
ID Identifier
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance PBCH Physical Broadcast Channel
P-CCPCH Primary Common Control Physical Channel
PCell Primary Cell
PCFICH Physical Control Format Indicator Channel
PDCCH Physical Downlink Control Channel
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PUCCH Physical Uplink Control Channel
PUSCH Physical Uplink Shared Channel
RAT Radio Access Technology
RB Resource Block
RF Radio Frequency
RLM Radio Link Management
RRC Radio Resource Control
RSCP Received Signal Code Power
RSRP Reference Symbol Received Power
RSRQ Reference Symbol Received Quality
RSSI Received Signal Strength Indicator
RSTD Reference Signal Time Difference
RTT Round Trip Time
Rx Receive
QAM Quadrature Amplitude Modulation
RACH Random Access Channel
RAT Radio Access Technology
RNC Radio Network Controller
RNTI Radio Network Temporary Identifier
RRC Radio Resource Control
RRM Radio Resource Management
SCH Synchronization Channel
SCell Secondary Cell
SDU Service Data Unit
SFN System Frame Number
SGW Serving Gateway
SI System Information
SIB System Information Block
SINR Signal to Interference plus Noise Ratio
SNR Signal to Noise Ratio
SON Self Optimized Network
TDD Time Division Duplex
TA Timing Advance
TDM Time Division Multiplexing
TOA Time Of Arrival
TTI Transmission Time Interval
Tx Transmit
UE User Equipment
UL Uplink
UMTS Universal Mobile Telecommunication System
UpPTS Uplink Pilot Time Slot
UTRA Universal Terrestrial Radio Access
UTRAN Universal Terrestrial Radio Access Network
WCDMA Wide CDMA
WLAN Wide Local Area Network

What is claimed is:

1. A network node comprising circuitry, the circuitry configured to:
  determine a time slot configuration, the time slot configuration including a first time slot for operating a first signal between a first cell on a first carrier and a wireless device, and a second time slot for operating a second signal between the first cell on the first carrier and the wireless device, the time slot configuration including:
    the first time slot adjacent to the second time slot which partly overlap with each other in time such that a first portion of the first time slot extends outside the second time slot, a second portion of the second time slot extends outside the first time slot, and remaining portions of the first and second time slots overlap with each other in time;
  indicate the time slot configuration to the wireless device to allow the wireless device to determine a same maximum output power value for the first time slot and second time slot based at least in part on a time window, the time window being determined based at least in part on a first time length of the first time slot, a second time length of the second time slot, and a time duration corresponding to the remaining portions of the first and second time slots overlapping with each other in time; and
  receive the first signal in the first time slot and the second signal in the second time slot, the first time slot and second time slot having been transmitted according to the same maximum output power value.

2. The network node of claim 1, wherein the first time slot and the second time slot have different time lengths.

3. The network node of claim 1, wherein the same maximum output power value is based on time lengths of the first time slot and the second time slot.

4. The network node of claim 1, wherein the first time slot and the second time slot are each a shortened time slot of less than 1 ms that are included in a subframe, the subframe having two slots where each slot is 0.5 ms.

5. The network node of claim 1, wherein the first time slot is subsequent in time to the second time slot.

6. The network node of claim 1, wherein the first time slot and the second time slot have a common Demodulation Reference Signal, DMRS.

7. The network node of claim 1, wherein the first time slot includes one taken from a group of 2 Orthogonal Frequency Division Multiplexing (OFDM) symbols, 3 OFDM symbols, 4 OFDM symbols and 7 OFDM symbols.

8. A method for a network node, the method comprising:
  determining a time slot configuration, the time slot configuration including a first time slot for operating a first signal between a first cell on a first carrier and a wireless device, and a second time slot for operating a second signal between the first cell on the first carrier and the wireless device, the time slot configuration including any of:
    the first time slot adjacent to the second time slot which at least partly overlap with each other in time such that a first portion of the first time slot extends outside the second time slot, a second portion of the second time slot extends outside the first time slot, and remaining portions of the first and second time slots overlap with each other in time; and
  indicating the time slot configuration to the wireless device to allow the wireless device to determine a same maximum output power value for the first time slot and second time slot based at least in part on a time window, the time window being determined based at least in part on a first time length of the first time slot, a second time length of the second time slot, and a time duration corresponding to the remaining portions of the first and second time slots overlapping with each other in time; and
  receiving the first signal in the first time slot and the second signal in the second time slot, the first time slot and second time slot having been transmitted using a maximum output power, the maximum output power being based on the time slot configuration.

9. The method of claim 8, wherein the first time slot and the second time slot have different time lengths.

10. The method of claim 8, wherein the same maximum output power value is based on time lengths of the first time slot and the second time slot.

11. The method of claim 8, wherein the first time slot and the second time slot are each a shortened time resource of less than 1 ms that are included in a subframe, the subframe having two slots where each slot is 0.5 ms.

12. The method of claim 8, wherein the first time slot is subsequent in time to the second time slot.

13. The method of claim 8, wherein the first time slot and the second time slot have a common Demodulation Reference Signal, DMRS.

14. The method of claim 8, wherein the first time slot includes one taken from a group of 2 Orthogonal Frequency Division Multiplexing (OFDM) symbols, 3 OFDM symbols, 4 OFDM symbols and 7 OFDM symbols.

15. A wireless device comprising circuitry, the circuitry configured to:
    determine a same maximum output power value to be used for transmitting signals in at least two time slots based at least in part on a time slot configuration and a time window, the time window being determined based at least in part on a first time length of a first time slot, a second time length of a second time slot, and a time duration corresponding to the remaining portions of the first and second time slots overlapping with each other in time, the time slot configuration including the first time slot for operating a first signal between a first cell on a first carrier and the wireless device, and the second time slot for operating a second signal between the first cell on the first carrier and the wireless device, the time slot configuration including:
        the first time slot adjacent to the second time slot which partly overlap with each other in time such that a first portion of the first time slot extends outside the second time slot, a second portion of the second time slot extends outside the first time slot, and remaining portions of the first and second time slots overlap with each other in time; and
    transmit, using the determined same maximum output power value, the first signal in the first time slot and the second signal in the second time slot.

16. The wireless device of claim 15, wherein the same maximum output power value is based on a time length of the first time slot and a time length of the second time slot.

17. The wireless device of claim 15, wherein the first time slot and the second time slot have different time lengths.

18. The wireless device of claim 15, wherein the first time slot and the second time slot are each a shortened time slot of less than 1 ms that are included in a subframe, the subframe having two slots where each slot is 0.5 ms.

19. The wireless device of claim 15, wherein the first time slot is subsequent in time to the second time slot.

20. The wireless device of claim 15, wherein the first time slot and the second time slot have a common Demodulation Reference Signal, DMRS.

21. The wireless device of claim 15, wherein the first time slot includes one taken from a group of 2 Orthogonal Frequency Division Multiplexing (OFDM) symbols, 3 OFDM symbols, 4 OFDM symbols and 7 OFDM symbols.

22. A method for a wireless device, the method comprising:
    determining a same maximum output power value to be used for transmitting signals in at least two time slots based at least in part on a time slot configuration and a time window, the time window being determined based at least in part on a first time length of a first time slot, a second time length of a second time slot, and a time duration corresponding to the remaining portions of the first and second time slots overlapping with each other in time, the time slot configuration including the first time slot for operating a first signal between a first cell on a first carrier and the wireless device, and the second time slot for operating a second signal between the first cell on the first carrier and the wireless device, the time slot configuration including:
        the first time slot adjacent to the second time slot which partly overlap with each other in time such that a first portion of the first time slot extends outside the second time slot, a second portion of the second time slot extends outside the first time slot, and remaining portions of the first and second time slots overlap with each other in time; and
    transmitting, using the determined same maximum output power value, the first signal in the first time slot and the second signal in the second time slot.

23. The method of claim 22, wherein the same maximum output power value is based on a time length of the first time slot and a time length of the second time slot.

24. The method of claim 22, wherein the first time slot and the second time slot have different time lengths.

25. The method of claim 22, wherein the first time slot and the second time slot are each a shortened time slot of less than 1 ms that are included in a subframe, the subframe having two slots where each slot is 0.5 ms.

26. The method of claim 22, wherein the first time slot is subsequent in time to the second time slot.

27. The method of claim 22, wherein the first time slot and the second time slot have a common Demodulation Reference Signal, DMRS.

28. The method of claim 22, wherein the first time slot includes one taken from a group of 2 Orthogonal Frequency Division Multiplexing (OFDM) symbols, 3 OFDM symbols, 4 OFDM symbols and 7 OFDM symbols.

* * * * *